US012377669B2

(12) United States Patent
Shimada et al.

(10) Patent No.: US 12,377,669 B2
(45) Date of Patent: Aug. 5, 2025

(54) RELAY TRANSPORT DEVICE, FEEDING SYSTEM, RECORDING SYSTEM, AND POSITION ADJUSTMENT METHOD

(71) Applicant: SEIKO EPSON CORPORATION, Tokyo (JP)

(72) Inventors: Chiaki Shimada, Azumino (JP); Katsumi Okamoto, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 84 days.

(21) Appl. No.: 18/509,749

(22) Filed: Nov. 15, 2023

(65) Prior Publication Data

US 2024/0165974 A1 May 23, 2024

(30) Foreign Application Priority Data

Nov. 17, 2022 (JP) ................................ 2022-184107

(51) Int. Cl.
*B41J 11/44* (2006.01)
*B41J 11/00* (2006.01)

(52) U.S. Cl.
CPC ............ *B41J 11/44* (2013.01); *B41J 11/0055* (2013.01)

(58) Field of Classification Search
CPC ........ B41J 11/44; B41J 11/0055; H04N 1/121
See application file for complete search history.

(56) References Cited

U.S. PATENT DOCUMENTS

2005/0212196 A1* 9/2005 Dobbertin ................ B65H 1/04 271/145
2007/0120318 A1* 5/2007 Moore ..................... B65H 1/04 271/148
2012/0091654 A1* 4/2012 Hagos .................... B65H 5/062 271/272
2016/0161894 A1* 6/2016 Shinkawa ................ B65H 5/36 271/226
2021/0237492 A1* 8/2021 Watari ..................... B65H 7/04

FOREIGN PATENT DOCUMENTS

JP H11-079430 A 3/1999

* cited by examiner

*Primary Examiner* — David H Banh
(74) *Attorney, Agent, or Firm* — WORKMAN NYDEGGER

(57) ABSTRACT

A relay transport device that is positioned between a recording device, which performs recording on a medium, and a feeding device, which is disposed outside the recording device and which feeds the medium to the recording device, and that relays and transports the medium fed from the feeding device to the recording device is a unit that forms a transport path for transporting the medium, and includes a relay unit, which has a medium discharge section for discharging the medium toward a receiving section of the recording device, and a coupling section, which couples together the relay unit and a support base that supports the relay unit.

20 Claims, 22 Drawing Sheets

RELAY TRANSPORT DEVICE, FEEDING SYSTEM, RECORDING SYSTEM, AND POSITION ADJUSTMENT METHOD

The present application is based on, and claims priority from JP Application Serial Number 2022-184107, filed Nov. 17, 2022, the disclosure of which is hereby incorporated by reference herein in its entirety.

BACKGROUND

1. Technical Field

The present disclosure relates to a relay transport device that is disposed between a recording device and a feeding device and that transports a medium. The present disclosure also relates to a recording system and a feeding system including the relay transport device. Further, the present disclosure relates to a position adjustment method for adjusting a position of the relay transport device with respect to the recording device.

2. Related Art

JP-A-11-079430 discloses a technique for coupling a large-capacity sheet feeding device to an image forming device. The large-capacity sheet feeding device of JP-A-11-079430 includes a housing and a sheet feeding unit, and the sheet feeding unit is provided on the housing via a transport guide so that the sheet feeding section is movable with respect to the housing. While the large-capacity sheet feeding device is being attached to the image forming device, the transport guide supporting the sheet feeding unit is moved and adjusted to fit the projection of the image forming device into the through hole of the transport guide, and by this the sheet take-in position of the image forming device and the sheet discharge position of the sheet feeding unit are aligned with each other. According to such a configuration, the sheet paths of the image forming device and the large-sized sheet feeding device can be easily aligned by merely operating the light-weight sheet feeding unit with respect to the heavy-weight housing of the large-capacity sheet feeding device.

In the large-capacity sheet feeding device and the image forming device described in JP-A-11-079430, the sheet take-in position of the image forming device and the sheet discharge position of the sheet feeding unit are aligned by fitting the projection of the image forming device into the through hole of the transport guide as described above. Therefore, after the projection is fitted into the through hole, the relative position between the sheet take-in position of the image forming device and the sheet discharge position of the sheet feeding unit cannot be finely adjusted. For this reason, even if the position where sheets are transferred from the large-capacity sheet feeding device to the image forming device is inappropriate in a state where the large-capacity sheet feeding device and the image forming device are connected to each other, the transfer position cannot be corrected, and as a result, there is a possibility that appropriate image formation cannot be performed in the image forming device.

SUMMARY

A relay transport device according to the present disclosure for solving the above problems is a relay transport device that is positioned between a recording device, which is for recording on a medium, and a feeding device, which is disposed outside the recording device and is configured to feed the medium to the recording device, and that is configured to relay and transport the medium fed from the feeding device to the recording device, and includes a relay unit that is a unit that forms a transport path for transporting the medium and that includes a medium discharge section configured to discharge the medium toward a receiving section of the recording device and a coupling section that couples the relay unit and a support base supporting the relay unit, wherein the coupling section couples the relay unit and the support base such that a position of the relay unit with respect to the support base is adjustable and a position of the medium discharge section with respect to the receiving section is adjusted by adjusting position of the relay unit with respect to the support base.

A feeding system according to the present disclosure includes the relay transport device and the feeding device that is supported by the support base and that feeds the medium to the relay transport device.

A feeding system according to the present disclosure includes the relay transport device and the feeding device configured to feed the medium to the relay transport device and that, assuming that the support base serves as a first support base, is supported by a second support base different from the first support base.

A feeding system according to the present disclosure includes the relay transport device and the feeding device configured to feed the medium to the relay transport device, wherein the coupling section allows pivoting of the relay unit along a support surface by which the support base supports the relay unit, the relay unit includes a skew correction section that corrects skew of the medium, the skew correction section includes a restriction section configured to position a first edge, which is one end side in a width direction, of the medium fed from the feeding device, the width direction being a direction intersecting a transport direction of the medium in the relay unit and a transport section that transports the medium toward the restriction section in an intersecting direction that intersects the transport direction and the width direction.

A recording system according to the present disclosure includes the relay transport device and the recording device configured to record on the medium transported by the relay transport device.

A recording system according to the present disclosure includes the relay transport device and the recording device configured to record on the medium transported by the relay transport device, wherein the coupling section allows pivoting of the relay unit along a support surface by which the support base supports the relay unit and the recording device includes a skew correction roller pair configured to correct skew of the medium.

A recording system according to the present disclosure includes the relay transport device and the recording device configured to record on the medium transported by the relay transport device, wherein the coupling section allows pivoting of the relay unit along a support surface by which the support base supports the relay unit, the relay unit includes a skew correction section that corrects skew of the medium, the skew correction section includes a restriction section configured to position a first edge, which is one end side in a width direction, of the medium fed from the feeding device, the width direction being a direction intersecting a transport direction of the medium in the relay unit and a transport section that transports the medium toward the restriction section in an intersecting direction that intersects the transport direction and the width direction, and the recording device includes a skew correction roller pair configured to correct skew of the medium.

The recording system of the present disclosure includes the feeding system and the recording device that performs recording on the medium fed by the feeding system.

A position adjustment method according to the present disclosure is a position adjustment method for adjusting a position of a relay transport device with respect to a recording device of a recording system including the recording device for recording on a medium, a feeding device disposed outside the recording device and configured to feed the medium to the recording device, and the relay transport device, which is positioned between the recording device and the feeding device and is configured to relay and transport the medium fed from the feeding device to the recording device, the relay transport device includes a relay unit that is a unit that forms a transport path for transporting the medium and that includes a medium discharge section configured to discharge the medium toward a receiving section of the recording device and a coupling section that couples the relay unit and a support base supporting the relay unit, the coupling section couples the relay unit and the support base such that a position of the relay unit with respect to the support base is adjustable, a position of the medium discharge section with respect to the receiving section is adjusted by adjusting a position of the relay unit with respect to the support base, the coupling section allows pivoting of the relay unit along a support surface by which the support base supports the relay unit, the relay unit includes a skew correction section that corrects skew of the medium, the skew correction section includes a restriction section configured to position one edge in a width direction of the medium fed from the feeding device, the width direction being a direction intersecting a transport direction of the medium in the relay unit and a transport section that transports the medium toward the restriction section in an intersecting direction that intersects the transport direction and the width direction, and the recording device includes a skew correction roller pair that corrects skew of the medium, the position adjustment method including a step of bringing a downstream edge of a correction sheet into contact with a nip position of the skew correction roller pair, the correction sheet having a lateral edge and the downstream edge, the lateral edge being along the transport direction, and the downstream edge being downstream in the transport direction and orthogonal to the lateral edge, and a step of pivoting the relay unit with respect to the support base such that the lateral edge of the correction sheet contacts along the restriction section.

A position adjustment method according to the present disclosure is a position adjustment method for adjusting a position of a relay transport device with respect to a recording device of a recording system including the recording device for recording on a medium, a feeding device disposed outside the recording device and configured to feed the medium to the recording device, and the relay transport device, which is positioned between the recording device and the feeding device and is configured to relay and transport the medium fed from the feeding device to the recording device, wherein the relay transport device includes a relay unit that is a unit that forms a transport path for transporting the medium and that includes a medium discharge section configured to discharge the medium toward a receiving section of the recording device and a coupling section that couples the relay unit and a support base supporting the relay unit, the coupling section couples the relay unit and the support base such that a position of the relay unit with respect to the support base is adjustable, a position of the medium discharge section with respect to the receiving section is adjusted by adjusting a position of the relay unit with respect to the support base, the coupling section allows pivoting of the relay unit along a support surface by which the support base supports the relay unit, the relay unit includes a skew correction section that corrects skew of the medium, the skew correction section includes a restriction section configured to position one edge in a width direction of the medium fed from the feeding device, the width direction being a direction intersecting a transport direction of the medium in the relay unit, and a transport section that transports the medium toward the restriction section in an intersecting direction that intersects the transport direction and the width direction, and the recording device includes a skew correction roller pair that corrects skew of the medium, the position adjustment method including a step of bringing a downstream edge of a correction sheet into contact with a nip position of the skew correction roller pair, the correction sheet having a lateral edge and the downstream edge, the lateral edge being along the transport direction, and the downstream edge being downstream in the transport direction and orthogonal to the lateral edge, a step of moving the relay unit along the transport direction with respect to the support base, a step of moving the relay unit along the width direction with respect to the support base, and a step of pivoting the relay unit with respect to the support base such that the lateral edge of the correction sheet contacts along the restriction section.

DESCRIPTION OF EMBODIMENTS

Figure 1:
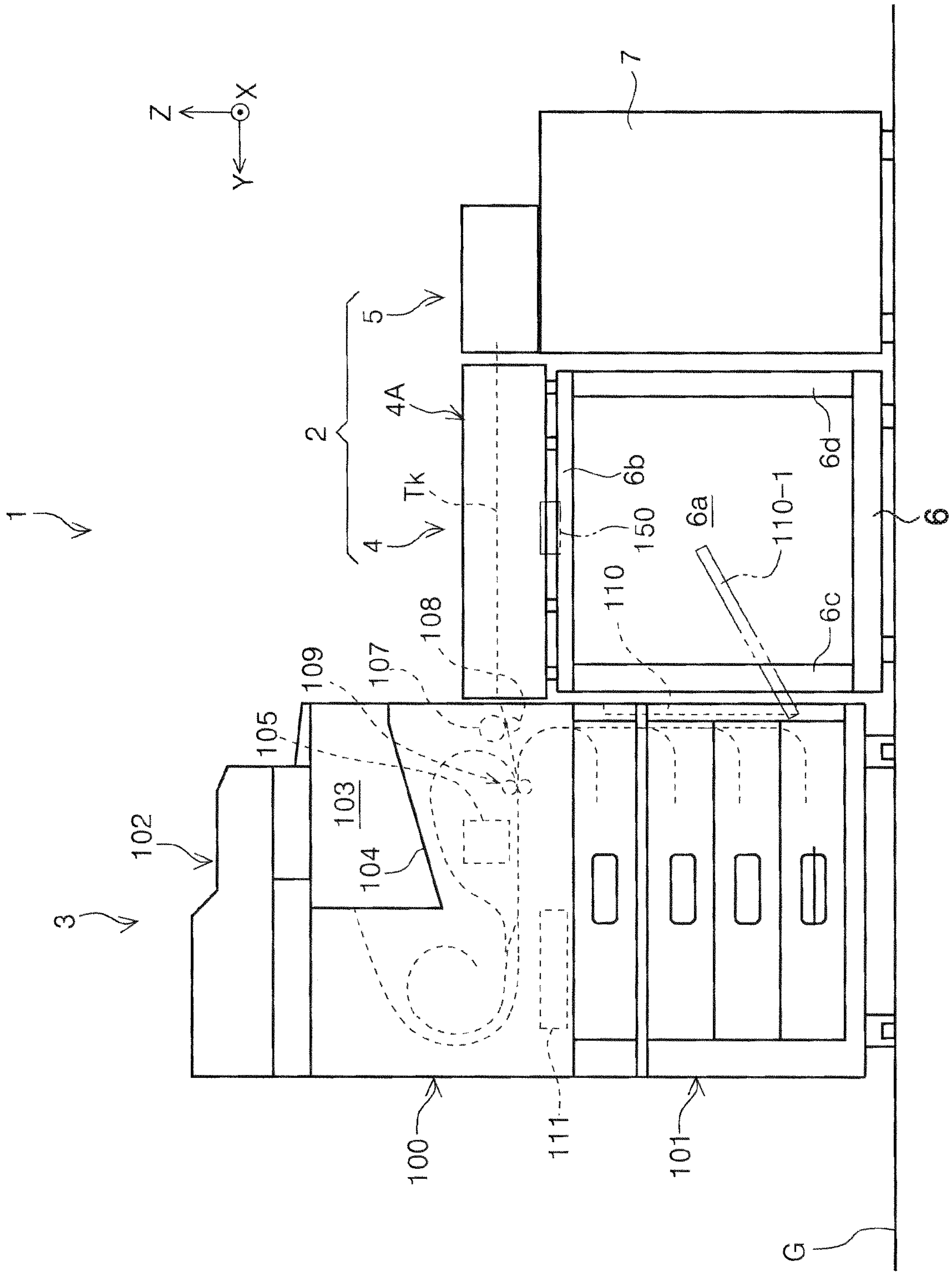
FIG. 1 is a front view of a recording system including a feeding system.

The present disclosure will be described in general terms.

A relay transport device according to a first aspect is a relay transport device that is positioned between a recording device, which is for recording on a medium, and a feeding device, which is disposed outside the recording device and is configured to feed the medium to the recording device, and that is configured to relay and transport the medium fed from the feeding device to the recording device, the relay transport device including a relay unit that is a unit that forms a transport path for transporting the medium and that includes a medium discharge section configured to discharge the medium toward a receiving section of the recording device and a coupling section that couples the relay unit and a support base supporting the relay unit, wherein the coupling section couples the relay unit and the support base such that a position of the relay unit with respect to the support base is adjustable and a position of the medium discharge section with respect to the receiving section is adjusted by adjusting a position of the relay unit with respect to the support base. According to this aspect, the position of the medium discharge section with respect to the receiving section is adjusted by adjusting a position of the relay unit with respect to the support base. Therefore, it is possible to flexibly adjust the transfer position of the medium from the relay transport device to the recording device, and it is possible to perform appropriate recording in the recording device.

A second aspect, is an aspect according to the first aspect, wherein the coupling section allows movement of the relay unit along a transport direction of the medium in the relay unit.

According to this aspect, the coupling section allows movement of the relay unit along a transport direction of the medium in the relay unit. Therefore, it is possible to adjust the interval in the transport direction between the relay unit and the recording device, and by this it is possible for the relay unit to reliably transfer the medium to the recording device.

A relay transport device according to a third aspect is an aspect according to the first aspect, wherein the coupling section allows movement of the relay unit along a width direction intersecting a transport direction of the medium in the relay unit.

According to this aspect, the coupling section allows movement of the relay unit along a width direction intersecting a transport direction of the medium in the relay unit. Therefore, it is possible to adjust the position in the width direction when the relay unit transfers the medium to the recording device, and thus it is possible to obtain appropriate recording quality in the recording device.

It should be noted that this aspect is not limited to the first aspect, and may be applied to the second aspect.

A fourth aspect is an aspect according to the first aspect, wherein the coupling section allows pivoting of the relay unit along a support surface by which the support base supports the relay unit.

According to this aspect, since the relay unit is pivotable along the support surface of the support base, it is possible to adjust the medium transport direction when the medium is transferred from the relay unit to the recording device. By this, it is possible to suppress skew when the medium is transferred from the relay unit to the recording device, and in addition it is possible to obtain appropriate recording quality in the recording device.

It should be noted that this aspect is not limited to the first aspect, and may be applied to the second or third aspect.

A fifth aspect is an aspect according to the fourth aspect, wherein the relay unit includes a skew correction section that corrects skew of the medium.

According to this aspect, the relay unit includes a skew correction section that corrects skew of the medium. Therefore, even when the medium fed from the feeding device is skewed, the skew can be corrected. In addition, in combination with the operational effects of the fourth aspect, that is, the relay unit being pivotable, it is possible to transfer the medium to the recording device in the appropriate orientation.

A sixth aspect is an aspect according to the fifth aspect, wherein the coupling section includes a first plate that is fixable and pivotable with respect to the support base and that is coupled to the relay unit.

According to this aspect, the relay unit can be pivoted by the first plate with a simple structure.

It should be noted that this aspect is not limited to the fifth aspect, and may be applied to the fourth aspect.

A seventh aspect is an aspect according to the sixth aspect, wherein the coupling section includes a second plate fixable to the support base and movable along a width direction, which is a direction intersecting a transport direction of the medium in the relay unit, and the first plate is fixable and pivotable with respect to the support base via the second plate and is fixable and movable along the transport direction with respect to the second plate.

According to this aspect, the coupling section includes a second plate fixable to the support base and movable along the width direction, and the first plate is fixed to the support base via the second plate. Therefore, the relay unit can move along the width direction in addition to being pivotable along the support surface. By this it is possible to adjust the position in the width direction for the time when the relay unit transfers the medium to the recording device, and thus it is possible to obtain appropriate recording quality in the recording device.

Further, since the first plate can be fixed to the second plate and can be moved along the transport direction, the relay unit can be further moved along the transport direction. Therefore, with a simple configuration, it is possible to adjust the position of the relay unit along the width direction and along the transport direction and also adjust the angle of the relay unit along the support surface. By this it is possible to adjust the interval in the transport direction between the relay unit and the recording device, and it is possible for the relay unit to reliably transfer the medium to the recording device.

An eighth aspect is an aspect according to the seventh aspect, wherein a spacer between a bottom plate of the relay unit and the support surface and a friction coefficient between the spacer and the support surface and a friction coefficient between the spacer and the bottom plate are lower than a friction coefficient between the support surface and the bottom plate.

According to this aspect, since the spacer is provided between the bottom plate of the relay unit and the support surface, it is possible to reduce contact area as compared with a case where the bottom plate of the relay unit and the support surface are in direct contact with each other, and it is possible to reduce frictional resistance when the relay unit moves with respect to the support base.

Also, a friction coefficient between the spacer and the support surface and a friction coefficient between the spacer and the bottom plate are lower than a friction coefficient between the support surface and the bottom plate. Therefore, it is possible to further reduce the frictional resistance when the relay unit moves with respect to the support base.

It should be noted that this aspect is not limited to the seventh aspect, and may be applied to any of the fourth to sixth aspects.

A feeding system according to a ninth aspect includes the relay transport device according to the first aspect, and a feeding device that is supported by the support base and that feeds the medium to the relay transport device.

According to this aspect, the operational effects of the first aspect described above can be obtained in the feeding system.

It should be noted that this aspect is not limited to the first aspect, and may be applied to any of the second to seventh aspects.

A feeding system according to a tenth aspect includes the relay transport device according to the first aspect and a feeding device configured to feed the medium to the relay transport device and that, assuming that the support base serves as a first support base, is supported by a second support base different from the first support base.

According to this aspect, the operational effects of the first aspect described above can be obtained in the feeding system.

It should be noted that this aspect is not limited to the first aspect, and may be applied to any of the second to seventh aspects.

A feeding system according to an eleventh aspect includes the relay transport device according to the fifth aspect and a feeding device configured to feed the medium to the relay transport device, wherein the skew correction section includes a restriction section configured to position one edge in a width direction of the medium fed from the feeding device, the width direction being a direction intersecting a transport direction of the medium in the relay unit, and a transport section that transports the medium toward the restriction section in an intersecting direction that intersects the transport direction and the width direction.

In a case where the skew is corrected by transporting the medium toward the restriction section, which positions the one edge of the medium, the relationship between the direction in which the feeding device transfers the medium to the relay transport device and the direction in which the transport section transports the medium is important. In the present aspect, since the relay unit is pivotable along the support surface, it is possible to adjust the direction in which the feeding device transfers the medium to the relay transport device and the direction in which the transport section transports the medium, and it is possible to appropriately transfer the medium from the feeding device to the relay transport device.

A twelfth aspect is an aspect according to the tenth aspect, further including a coupling section coupling the feeding device and the relay unit.

According to this aspect, because the coupling section coupling the feeding device and the relay unit is further provided, it is possible to suppress change in the positional relationship between the feeding device and the relay unit. In particular, in a case where a support base that supports the relay transport device and a support base that supports the feeding device are separate from each other, the positional relationship between the feeding device and the relay unit is likely to change. However, by the coupling section, it is possible to suppress change in the positional relationship between the feeding device and the relay unit.

It should be noted that this aspect is not limited to the tenth aspect, and may be applied to the ninth aspect.

A thirteenth aspect is an aspect according to the ninth aspect, wherein the support base is configured to adjust a position of the relay unit in a vertical direction.

According to this aspect, the support base is configured to adjust the position of the relay unit in the vertical direction, so it is possible to adjust the position in the vertical direction for the time when the medium is transferred from the relay unit to the recording device, and it is possible to more appropriately transfer the medium from the relay unit to the recording device.

A fourteenth aspect is an aspect according to the tenth aspect, wherein the first support base is configured to adjust the position of the relay unit in the vertical direction.

According to this aspect, the first support base is configured to adjust the position of the relay unit in the vertical direction. Therefore, it is possible to adjust the position in the vertical direction for the time when the medium is transferred from the relay unit to the recording device, and it is possible to more appropriately transfer the medium from the relay unit to the recording device.

A recording system according to a fifteenth aspect includes the relay transport device according to any one of the first to eighth aspects and the recording device configured to record on the medium transported by the relay transport device.

According to this aspect, a recording system including the relay transport device and the recording device can obtain the operational effects of any one of the first to eighth aspects.

A recording system according to a sixteenth aspect includes the relay transport device according to any one of the fourth to eighth aspects and the recording device configured to record on the medium transported by the relay transport device, wherein the recording device includes a skew correction roller pair configured to correct skew of the medium.

According to this aspect, by pivoting the relay unit such that the axial direction of the skew correction roller pair and the medium transport direction by the relay unit are orthogonal to each other, it is possible to suppress the medium from being transferred from the relay transport device to the recording device in a skew state that exceeds the skew correction capability of the skew correction roller pair, and it is possible to obtain more appropriate recording quality.

A recording system according to a seventeenth aspect includes the relay transport device according to any one of the fifth to eighth aspects and the recording device configured to record on the medium transported by the relay transport device, wherein the skew correction section includes a restriction section configured to position one edge in a width direction of the medium fed from the feeding device, the width direction being a direction intersecting a transport direction of the medium in the relay unit, and a transport section that transports the medium toward the restriction section in an intersecting direction that intersects the transport direction and the width direction, and the recording device includes a skew correction roller pair configured to correct skew of the medium.

According to this aspect, by pivoting the relay unit such that the axial direction of the skew correction roller pair and the medium transport direction by the relay unit are orthogonal to each other, it is possible to transfer the medium that had the skew suppressed in the relay unit to the recording device at an appropriate angle with its skew corrected state maintained. By this it is possible to appropriately suppress the medium from being transferred from the relay transport device to the recording device in a skew state that exceeds the skew correction capability of the skew correction roller pair, and it is possible to obtain more appropriate recording quality.

An eighteenth aspect is an aspect according to the fifteenth aspect, wherein the recording device includes a mount section to which is attachable a placement tray configured to have placed thereon a medium, the receiving section of the recording device is configured to feed the medium placed on the placement tray, and the medium is transferable from the relay unit to the receiving section in a state where the placement tray is detached from the mounting section.

According to this aspect, the medium is transferable from the relay unit to the receiving section in a state where the placement tray is detached from the mounting section. Therefore, it is possible to feed the medium of a type or an amount which cannot be mounted on the placement tray to inside the recording device, and usability is improved. Since the receiving section can feed the medium placed on the placement tray, that is, the receiving section has both a function of feeding the medium from the placing tray and a function of receiving the medium from the relay unit, it is possible to suppress an increase in cost of the device.

It should be noted that this aspect is not limited to the fifteenth aspect, and may be applied to the sixteenth or seventeenth aspect.

A recording system according to a nineteenth aspect includes the feeding system according to any one of the ninth to fourteenth aspects and the recording device that performs recording on the medium fed by the feeding system.

According to this aspect, the operational effects of any one of the ninth to fourteenth aspects can be obtained in the recording system.

A position adjustment method according to a twentieth aspect is for a recording system that includes the recording device for recording on a medium, a feeding device disposed outside the recording device and configured to feed the medium to the recording device, and a relay transport device, which is positioned between the recording device and the feeding device and is configured to relay and transport the medium fed from the feeding device to the recording device, wherein the relay transport device includes a relay unit that is a unit that forms a transport path for transporting the medium and that includes a medium discharge section configured to discharge the medium toward a receiving section of the recording device and a coupling section that couples the relay unit and a support base supporting the relay unit, the coupling section couples the relay unit and the support base such that a position of the relay unit with respect to the support base is adjustable and a position of the medium discharge section with respect to the receiving section is adjusted by adjusting a position of the relay unit with respect to the support base, the coupling section allows pivoting of the relay unit along a support surface by which the support base supports the relay unit, the relay unit includes a skew correction section that corrects skew of the medium, the skew correction section includes a restriction section configured to position a first edge, which is one end side in a width direction, of the medium fed from the feeding device, the width direction being a direction intersecting a transport direction of the medium in the relay unit and a transport section that transports the medium toward the restriction section in an intersecting direction that intersects the transport direction and the width direction, the recording device includes a skew correction roller pair that corrects skew of the medium, the position adjustment method including a step of bringing a second edge of a correction sheet, which has a first edge along a transport direction and the second edge, which is orthogonal to the first edge, into contact with a nip position of the skew correction roller pair, and a step of pivoting the relay unit with respect to the support base so that the first edge of the correction sheet comes into contact along the restriction section.

According to this aspect, in a state in which the second edge of the correction sheet is in contact with the nip position of the skew correction roller pair, by pivoting the relay unit with respect to the support base such that the first edge of the correction sheet comes into contact along the restriction section, it is possible to transfer the medium that had the skew suppressed in the relay unit to the recording device at an appropriate angle with its skew corrected state maintained. By this it is possible to appropriately suppress the medium from being transferred from the relay transport device to the recording device in a skew state that exceeds the skew correction capability of the skew correction roller pair, and it is possible to obtain more appropriate recording quality.

A position adjustment method for a recording system according to a twenty first aspect is for adjusting a position of a relay transport device with respect to a recording device of a recording system, wherein the recording system includes the recording device for recording on a medium, a feeding device disposed outside the recording device and configured to feed the medium to the recording device, and the relay transport device, which is positioned between the recording device and the feeding device and is configured to relay and transport the medium fed from the feeding device to the recording device, the relay transport device includes a relay unit that is a unit that forms a transport path for transporting the medium and that includes a medium discharge section configured to discharge the medium toward a receiving section of the recording device and a coupling section that couples the relay unit and a support base supporting the relay unit, the coupling section couples the relay unit and the support base such that a position of the relay unit with respect to the support base is adjustable, a position of the medium discharge section with respect to the receiving section is adjusted by adjusting a position of the relay unit with respect to the support base, the coupling section allows pivoting of the relay unit along a support surface by which the support base supports the relay unit, the relay unit includes a skew correction section that corrects skew of the medium, the skew correction section includes a restriction section configured to position a first edge, which is one end side in a width direction, of the medium fed from the feeding device, the width direction being a direction intersecting a transport direction of the medium in the relay unit and a transport section that transports the medium toward the restriction section in an intersecting direction that intersects the transport direction and the width direction, the recording device includes a skew correction roller pair that corrects skew of the medium, the position adjustment method including a step of bringing a second edge of a correction sheet, which has a first edge along a transport direction and the second edge, which is orthogonal to the first edge, into contact with a nip position of the skew correction roller pair, a step of moving the relay unit along the transport direction with respect to the support base, a step of moving the relay unit along the width direction with respect to the support base, and a step of pivoting the relay unit with respect to the support base so that the first edge of the correction sheet comes into contact along the restriction section.

According to this aspect, by moving the relay unit along the transport direction with respect to the support base, it is possible to appropriately set the relative position in the transport direction between the relay unit and the recording device, and to appropriately transfer the medium from the relay unit to the recording device.

By moving the relay unit along the width direction with respect to the support base, it is possible to appropriately set the relative position in the width direction between the relay unit and the recording device, and it is possible to appropriately set the width direction position of the medium when the medium is transferred to the recording device.

In a state where the second edge of the correction sheet is in contact with the nip position of the skew correction roller pair, the relay unit is pivoted with respect to the support base such that the first edge of the correction sheet comes into contact with the restriction section along the restriction section, and by this it is possible to transfer the medium that had the skew suppressed in the relay unit to the recording device at an appropriate angle with its skew corrected state maintained. By this it is possible to appropriately suppress the medium from being transferred from the relay transport device to the recording device in a skew state that exceeds the skew correction capability of the skew correction roller pair, and it is possible to obtain more appropriate recording quality.

Hereinafter, the present disclosure will be specifically described.

Hereinafter, a recording system 1, a feeding system 2, and a relay transport device 4 according to an embodiment of the present disclosure will be described.

In each drawing, an X-axis direction is a depth direction of each device, and is a width direction of a medium represented by a recording sheet. Among the X-axis directions, the +X direction is a direction from the device rear surface toward the device front surface, and the −X direction is a direction from the device front surface toward the device rear surface.

The Y-axis direction is the device width direction of each device, and among the Y-axis directions, the +Y direction is the left direction as viewed from a user facing the device front surface, and the −Y direction is the right direction. The +Y direction is a transport direction of the medium in the relay transport device 4. The +Y direction is a transport direction of the medium in the relay transport device 4 (to be described later).

A Z-axis direction is a device height direction of each device and is a vertical direction, a +Z direction is a vertically upward direction, and a −Z direction is a vertically downward direction. In the following description, the +Z direction may be simply referred to as upward, and the −Z direction may be simply referred to as downward.

Hereinafter, a direction in which the medium is transported may be referred to as a transport direction or downstream of the transport direction, and a direction opposite to the transport direction may be referred to as upstream of the transport direction.

In FIG. 1, the transport path of the medium is indicated by dashed line. In the recording system 1, the medium is transported through the transport path indicated by dashed line.

Configuration of Recording System, Feeding System, and Recording Device

In FIG. 1, a recording system 1 includes a recording device 3, a relay transport device 4, and a feeding device 5. The relay transport device 4 and the feeding device 5 constitute a feeding system 2. In other words, the recording system 1 includes the recording device 3 and the feeding system 2.

The recording device 3, the relay transport device 4, and the feeding device 5 are independent devices. The recording device 3 is installed on an installation surface G, the relay transport device 4 is supported by a first support base 6, which is installed on the installation surface G, and the feeding device 5 is supported by a second support base 7, which is installed on the installation surface G. The recording device 3, the relay transport device 4, and the feeding device 5 are arranged side by side along the Y-axis direction.

The recording device 3 is configured as an inkjet printer that performs recording by ejecting ink, which is an example of liquid, onto the medium, and includes a line head 105, which is an example of a recording section. The recording device 3 is a so-called multifunction device including an image reading device 102 in an upper section of the device.

However, the recording device 3 is not limited to an inkjet printer, and may be a device that performs recording by another method such as a laser printer, a thermal transfer printer, or a dot impact printer.

The recording device 3 is provided with a medium accommodation section 101 for accommodating the medium to be fed in a lower section of a device main body 100, which is provided with the line head 105. The medium accommodation section 101 includes a plurality of medium accommodation cassettes along the vertical direction.

The device main body 100 includes a plurality of transport roller pairs (not shown) for transporting the medium, and the medium on which recording has been performed by the line head 105 is discharged to an in-body discharge section 103 and stacked on a discharge tray 104.

The device main body 100 is provided with a control section 111 for controlling the entire recording system 1. The control section 111 includes a CPU (not shown), a nonvolatile memory, and the like, and all the controls executed in the recording system 1 are realized by executing a control program held in the nonvolatile memory.

It should be noted that in the present embodiment, the control section 111 is provided in the recording device 3 and controls the relay transport device 4 connected to the recording device 3 and the feeding device 5 connected to the relay transport device 4. However, the relay transport device 4 and the feeding device 5 may include a control section for controlling each device, and the control section 111 of the recording device 3, the control section (not shown) of the relay transport device 4, and the control section (not shown) of the feeding device 5 may transport the medium in cooperation with each other.

The recording device 3 includes a feed roller 107 and a separation roller 108 as a receiving section on the right side of the device main body 100, and is configured to be able to receive a medium from the right side of the device main body 100. The feed roller 107 is disposed at a predetermined height from the installation surface G. The relay transport device 4 (to be described later) supplies the medium to the feed roller 107.

In a case where the medium is received from the right side section of the device main body 100, the medium is sent by rotation of a feeding roller 107 to a registration roller pair 109, which is an example of a skew correction roller pair, while receiving a separation action by a separation roller 108. At this time, the leading edge of the medium contacts against the registration roller pair 109 and a bend is formed in the medium between the registration roller pair 109 and the feed roller 107, and by this, the leading edge of the medium aligns with the registration roller pair 109 and skew is corrected.

Figure 2:
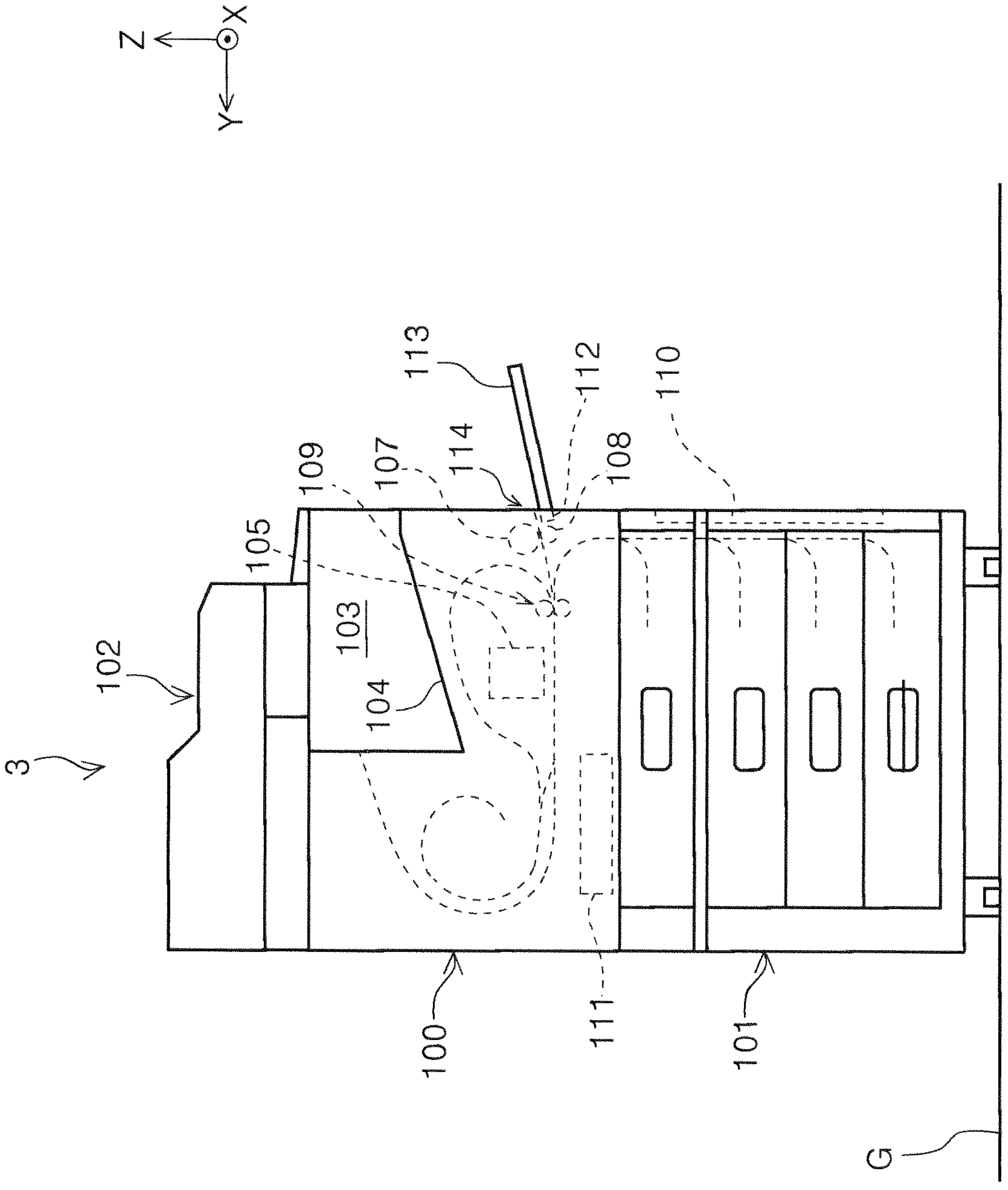
FIG. 2 is a front view of the recording device.

It should be noted that as shown in FIG. 2, a placement tray 113 is rotatably and detachably provided in a mounting section 114 on a right side surface of the device main body 100. In a case where the relay transport device 4 (to be described later) is not coupled to the recording device 3, it is possible to mount the placement tray 113 in the mounting section 114, place a medium on the placement tray 113, and feed the placed medium using the feed roller 107. It should be noted that reference number 112 is a medium support section that supports the medium at the position of the feeding roller 107.

When the relay transport device 4 (to be described later) is coupled to the recording device 3, the placement tray 113 is removed and the relay transport device 4 is coupled. Note that the placement tray 113 is provided so as to be able to take a closed state (not shown), in which the placement tray 113 forms the right side surface of the device main body 100, and an open state (FIG. 2), in which a medium can be placed thereon, and because the placement tray 113 is in a position that does not interfere with the first support base 6 while in the open state, it is not always necessary to remove the placement tray 113 when coupling with the relay transport device 4 (to be described later).

Returning to FIG. 1, the relay transport device 4 is a device positioned between the recording device 3 and the feeding device 5, which is disposed outside the recording device 3 and which feeds the medium to the recording device 3. The relay transport device 4 relays the medium fed from the feeding device 5 and transports the medium to the feeding roller 107 of the recording device 3.

The medium is supplied from the feeding device 5 to the relay transport device 4, and is transported to the feed roller 107 via the transport path Tk of the relay transport device 4. As will be described in detail later, skew of the medium is corrected in the transport path Tk.

The relay transport device 4 is supported by the first support base 6 such that a position in the vertical direction at which the medium is supplied to the recording device 3 matches the feeding roller 107. A space section 6*a* that allows opening and closing of an opening and closing body 110, which is provided on the right side surface of the recording device 3, is formed at the lower side of the first support base 6. By this, it is possible to avoid the first support base 6 from inhibiting the opening and closing of the opening and closing body 110.

The opening and closing body 110 forms a portion of the right side surface of the device main body 100, can open as indicated in two dot chain line by a reference symbol 110-1, and by opening can open up the transport path of the medium from the medium accommodation section 101 to the device main body 100.

Here, a section which couples the device main body 100 of the recording device 3 and the first support base 6, which supports the relay transport device 4, will be described with reference to FIGS. 3 and 4.

Figure 3:
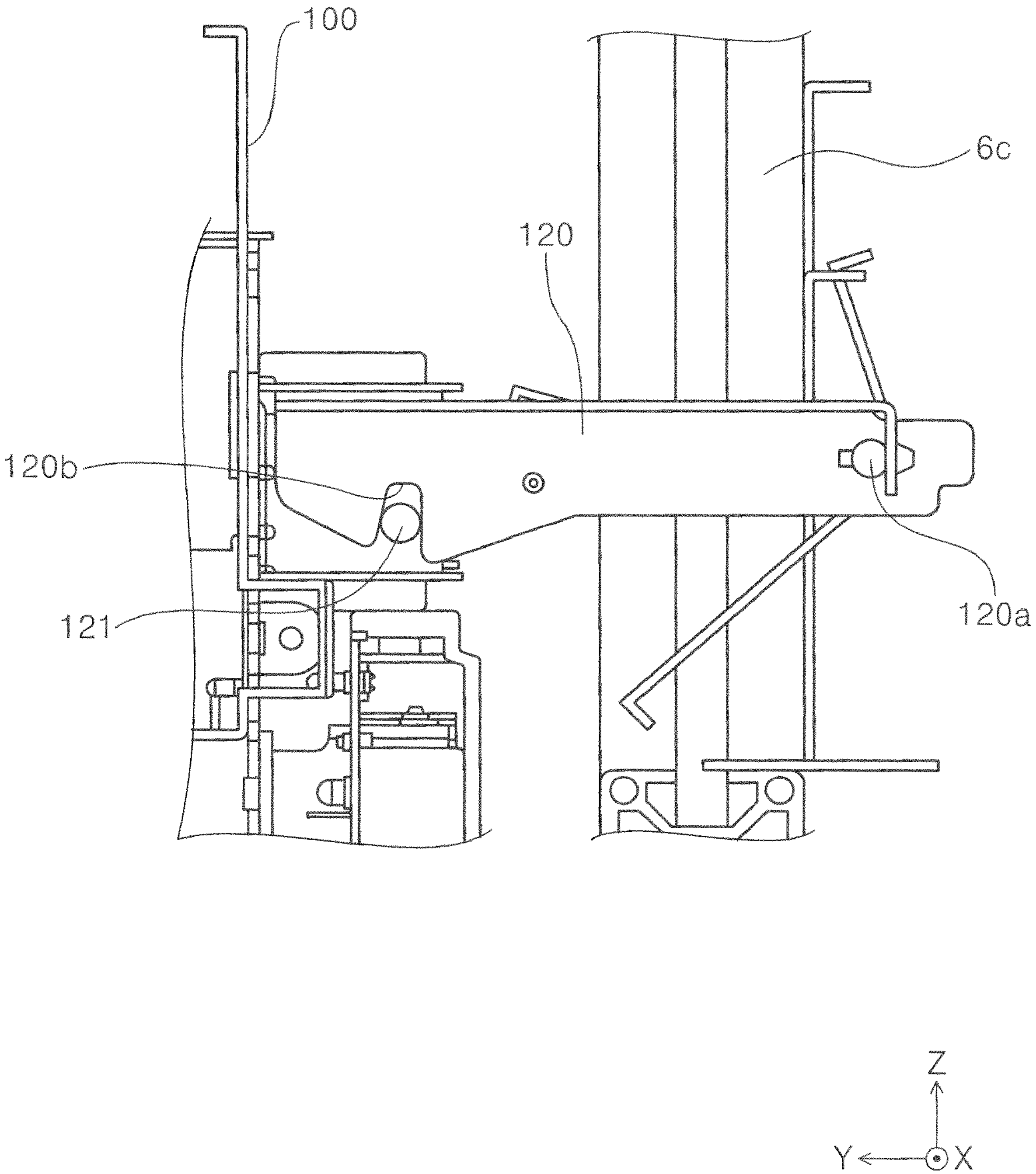
FIG. 3 is a front view of a section coupling the recording device and a first support base.

As shown in FIG. 3, the first support base 6 has a vertical stay 6*c*. The vertical stay 6*c* is a stay which faces the −Y direction side surface of the device main body 100 of the recording device 3. Although not shown, vertical stays 6*c* are arranged at intervals along the X-axis direction, and coupling hooks 120 and engagement pins 121 described below are also arranged at intervals along the X-axis direction.

The coupling hook 120 is provided on the vertical stay 6*c* so as to be rotatable about a rotation shaft 120*a*. The rotation shaft 120*a* is a rotation shaft having a rotation axial center parallel to the X-axis direction.

An engagement groove 120*b* is formed in the coupling hook 120. The engagement groove 120*b* is formed so as to widen toward the lower side, with respect to the state of the coupling hook 120 shown in FIG. 3.

The engagement pin 121 is provided in the device main body 100 of the recording device 3, and the device main body 100 of the recording device 3 and the first support base 6 are coupled to each other so that the relative positions thereof in the Y-axis direction are determined by the engagement pin 121 entering the engagement groove 120*b* of the coupling hook 120.

Figure 4:
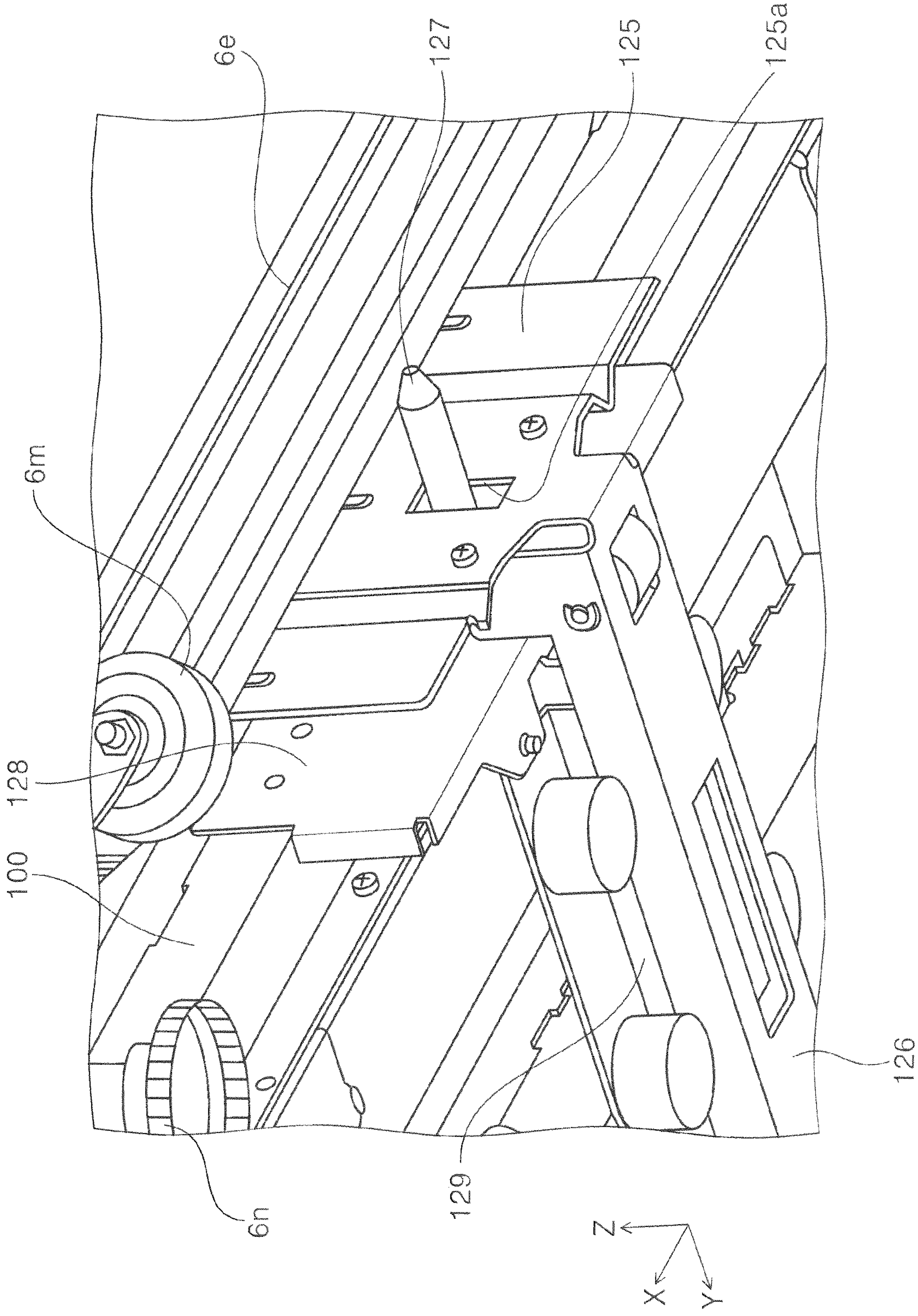
FIG. 4 is a perspective view of another section that couples the recording device and the first support base.

Next, as shown in FIG. 4, the first support base 6 has a horizontal stay 6*e* in the −Z direction from the position where the coupling hook 120 is provided. The horizontal stay 6*e* is a stay extending in the X-axis direction and is provided at a position facing the −Y direction side surface of the device main body 100. The horizontal stay 6*e* is provided with a plate member 125. An elongated hole 125*a* extending in the Z-axis direction is formed in the plate member 125. A guide rail 126 extending in the +Y direction from the lower end section of the plate member 125, that is, toward the recording device 3, is provided integrally with the plate member 125.

The device main body 100 of the recording device 3 is provided with a plate member 128. The plate member 128 is provided so that its position in the Z-axis direction with respect to the device main body 100 can be adjusted by an adjustment section (not shown). The plate member 128 is provided with a boss 127 that protrudes in the −Y direction, that is, toward the first support base 6.

In the above-described configuration, when the first support base 6 is moved in the +Y direction toward the device main body 100 of the recording device 3, the boss 127 enters the elongated hole 125*a*, and by this the device main body 100 of the recording device 3 and the first support base 6 are coupled to each other so that the relative positions thereof in the X-axis direction are determined.

Note that a guide section 129 is provided integrally with the plate member 128. On the other hand, the guide rail 126 is formed in a concave shape so as to be able to receive the guide section 129. When the first support base 6 is moved in the +Y direction toward the device main body 100 of the recording device 3, the guide section 129 enters a state of being inside the guide rail 126, and the guide section 129 moves relatively inside the guide rail 126, so that the boss 127 is guided in the elongated hole 125*a*.

Note that support legs 6*n* are provided at the four corners of the bottom of the first support base 6. The support legs 6*n* are provided so as to be expandable and contractible in the Z-axis direction by a screw structure, and by this the height of the entire first support base 6 in the Z-axis direction can be adjusted. Reference sign 6*m* denotes casters, which can reduce resistance when the first support base 6 is moved.

In FIG. 1, reference sign 6*b* denotes a support plate for supporting the relay transport device 4 on the first support base 6, and the support plate 6*b* is supported on the vertical stays 6*c* and 6*d* by a support section (not shown). The position of the support section where the vertical stays 6*c* and 6*d* are fixed can be adjusted in the Z-axis direction. In this manner, by adjusting the position of the support section in the Z-axis direction, the position of the support plate 6*b*, that is, the relay transport device 4 can also be adjusted in the Z-axis direction.

The relay transport device 4 may be configured to be displaceable in the Z-axis direction with respect to the support plate 6*b*.

Note that the relay transport device 4 is a unit that forms a transport path for the medium, and includes a relay unit 4A having a discharge roller pair 26 (see FIG. 5) that discharges the medium toward the feed roller 107 of the recording device 3, and a coupling section 150. The relay unit 4A and the support plate 6*b* are coupled by the coupling section 150. The configuration of the coupling section 150 will be described later.

The first support base 6 and the second support base 7 are coupled to each other by a coupling section (not shown) after the positional relationship in the X-axis direction and the Y-axis direction is adjusted. By this, it is possible to adjust the transport direction of the medium when the medium is transferred from the feeding device 5 to the relay transport device 4, and to appropriately transfer the medium from the feeding device 5 to the relay transport device 4.

Note that the feeding device 5 includes a coupling section (not shown), and the feeding device 5 and the second support base 7 are coupled to each other by the coupling section. However, in the present specification, a description of the coupling section that couples the feeding device 5 and the second support base 7 is omitted.

Configuration of Relay Transport Device

Next, basic configuration of the relay transport device 4 will be described with reference to FIGS. 5 to 8.

The relay transport device 4 includes a first restriction section 31 for positioning a first edge Ps1, which is one widthwise direction edge (edge in the +X direction) of the medium supplied from the feeding device 5, and a transport section 10 for transporting the medium toward a first restriction surface 31*a* in an intersecting direction D, which intersects the +Y direction, which is the transport direction, and the X-axis direction, which is the widthwise direction. The first restriction section 31 includes the first restriction surface 31*a* for positioning the first edge Ps1. The first restriction section 31 and the transport section 10 constitute a skew correction section 9 that corrects the skew of the medium.

Figure 5:
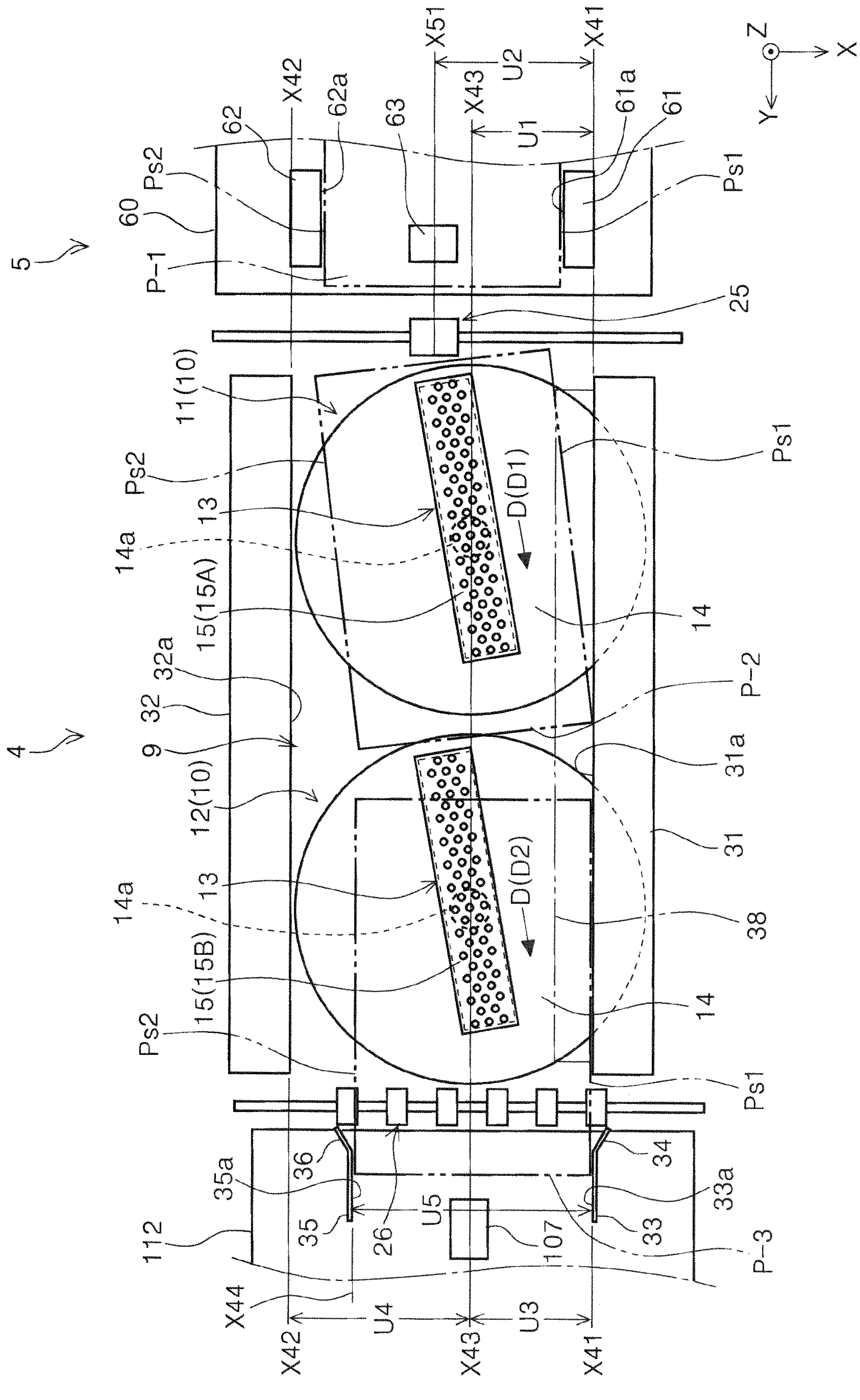
FIG. 5 is a plan view of a relay transport device, a portion of the recording device, and portion of the feeding device.

In FIG. 5, a reference symbol P-2 and a reference symbol P-3 indicate an example of the medium to be transported, and the medium indicated by the reference symbol P-3 is obtained by correcting the skew of the medium indicated by the reference symbol P-2.

The first restriction surface 31*a* can abut against the first edge Ps1 of the medium, is parallel to the Y-axis direction, and extends along the Y-axis direction.

The first restriction section 31 is provided so as to be displaceable in the X-axis direction, that is, in the width direction of the medium while being guided by a guide section (not shown). In the present embodiment, the displacement of the first restriction section 31 in the width direction is performed by a manual operation of the user. However, it goes without saying that the displacement of the first restriction section 31 in the width direction may be performed by power of a motor or the like.

In the present embodiment, the transport section 10 includes a first transport section 11 and a second transport section 12 disposed downstream of the first transport section 11.

Note that in the present embodiment, the transport section 10 includes the first transport section 11 and the second transport section 12, that is, includes a plurality of transport sections, but may include a single transport section.

Note that a direction in which the first transport section 11 transports the medium toward the first restriction section 31 is referred to as a first direction D1, and a direction in which the second transport section 12 transports the medium toward the first restriction section 31 is referred to as a second direction D2. The first direction D1 and the second direction D2 are both examples of the intersecting direction D. In the present embodiment, the second direction D2 is a direction along the first direction D1.

In the present embodiment, the basic configurations of the first transport section 11 and the second transport section 12 are the same, and each of the transport sections is provided with a belt unit 13 on a rotation table 14. The belt unit 13 includes a transport belt 15. However, hereinafter, the transport belt 15 included in the first transport section 11 may be referred to as a first transport belt 15A as necessary, and the transport belt 15 included in the second transport section 12 may be referred to as a second transport belt 15B as necessary.

The rotation table 14 supports the transported medium from below. The rotation table 14 is rotatable in a clockwise direction and a counterclockwise direction in FIG. 5 around a rotation shaft 14*a*, that is, the transport belt 15 is rotatable in plan view (as viewed from the +Z direction). By the rotation of the rotation table 14, the direction in which the transport belt 15 applies the transport force to the medium, that is, the intersecting direction D can be changed.

Figure 12:
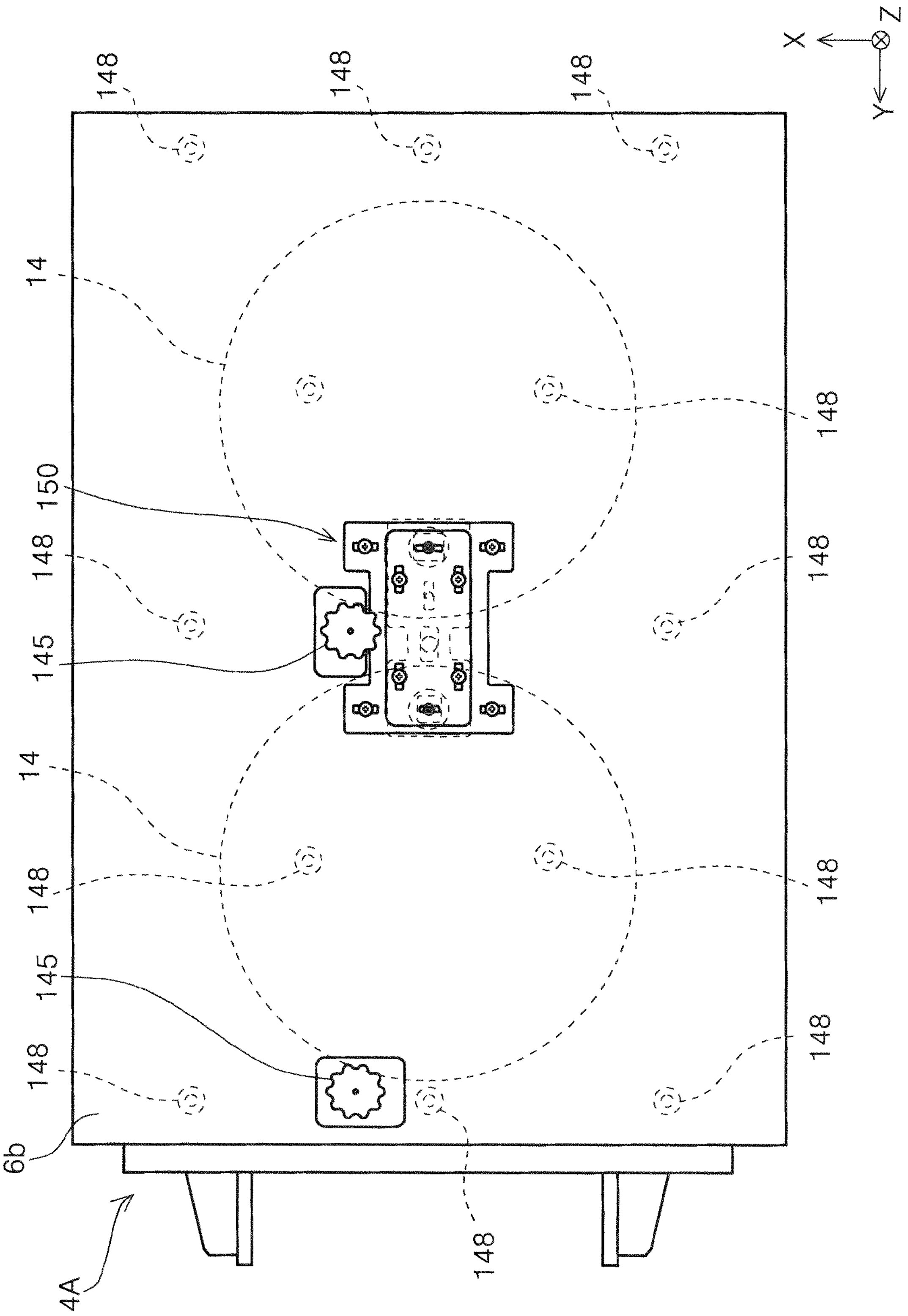
FIG. 12 is a plan view of a support plate for supporting the relay transport device as viewed from below.
Figure 13:
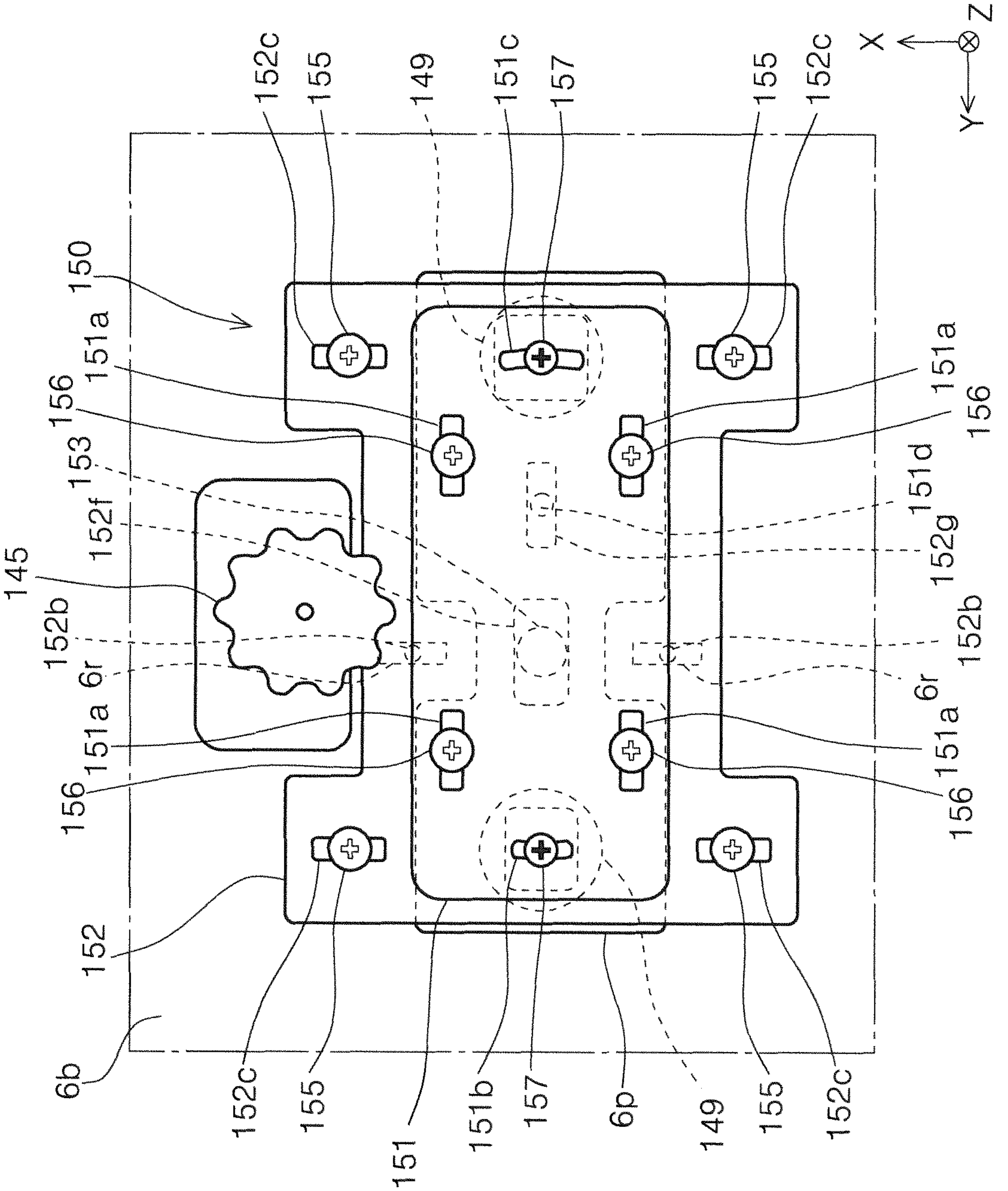
FIG. 13 is an enlarged view of a coupling section in FIG. 12.
Figure 14:
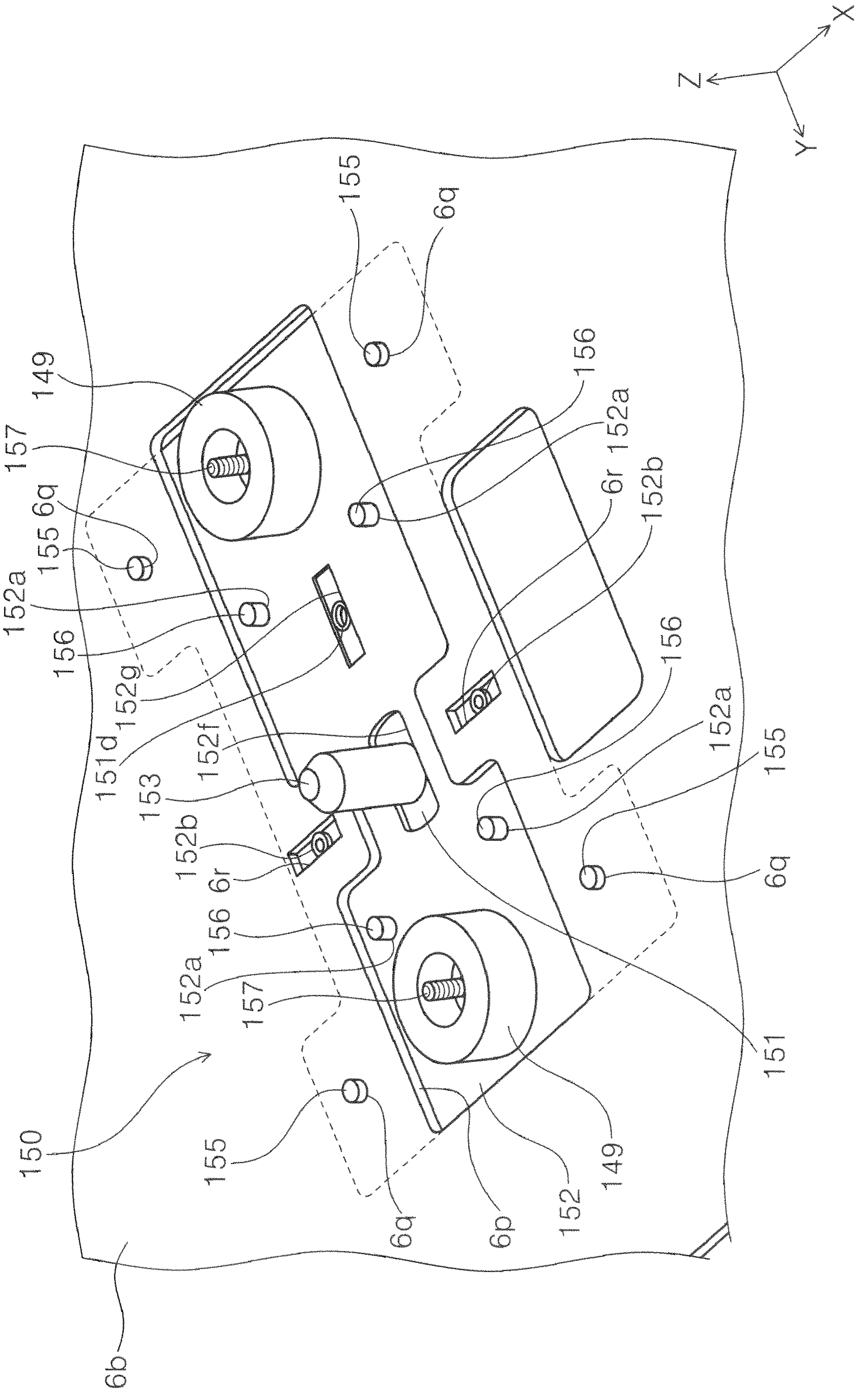
FIG. 14 is a perspective view of the coupling section as viewed from above.
Figure 15:
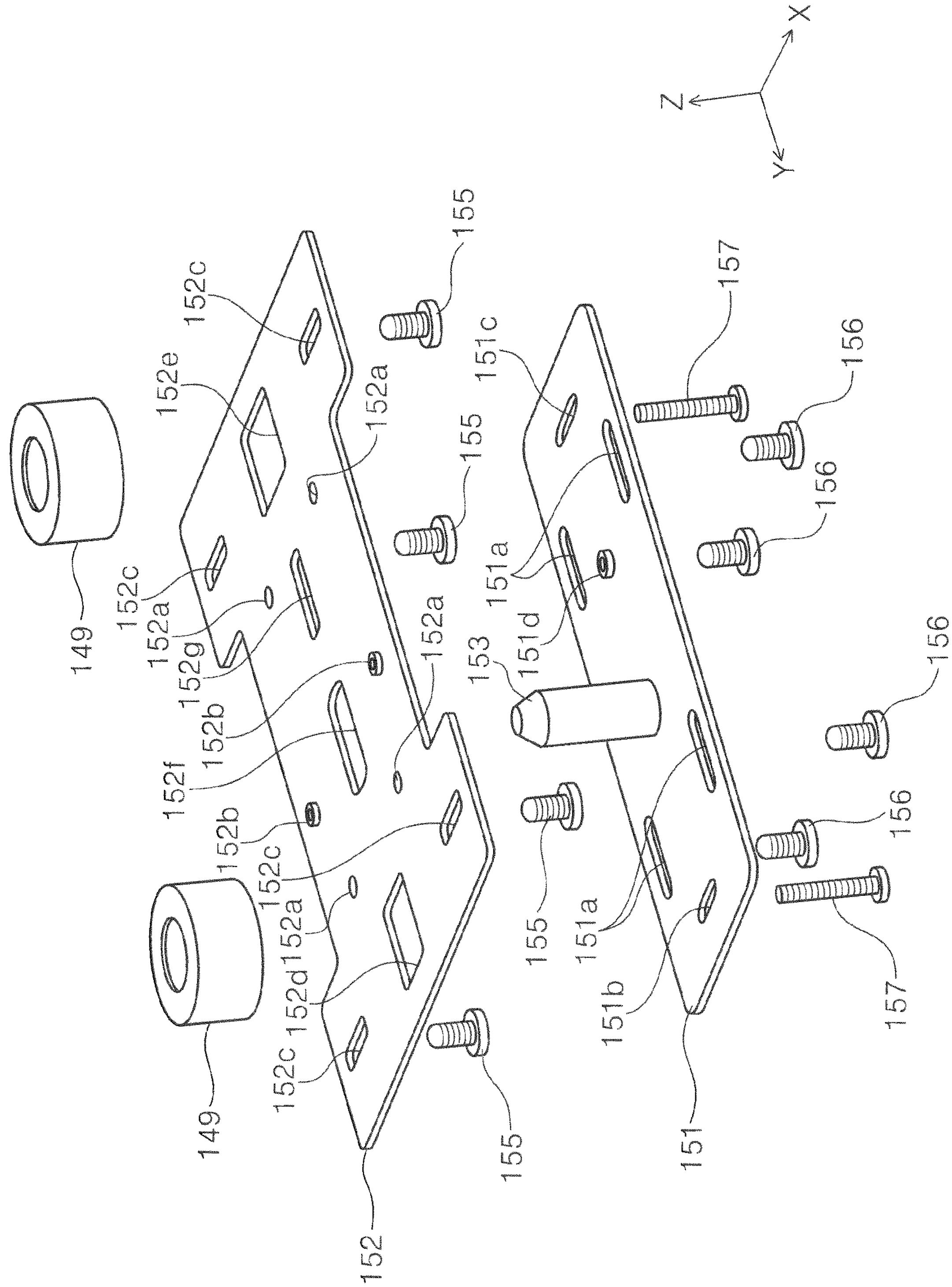
FIG. 15 is an exploded perspective view of the coupling section.

Note that as shown in FIG. 12, a rotation knob 145 is rotatably provided on the lower side of the support plate 6*b* for supporting the relay unit 4A. The rotation knob 145 is engaged with the outer peripheral section of the rotation table 14, and the rotation table 14 can be rotated by manually rotating the rotation knob 145.

In FIG. 5, the transport belt 15 is provided on the upstream side in the transport direction with respect to the rotation shaft 14*a* of the rotation table 14 in the present embodiment. Said differently, "the transport belt 15 is provided upstream in the transport direction with respect to the rotation shaft 14*a*" is a situation where the rotation shaft 14*a* is positioned downstream with respect to the transport direction center of the transport belt 15, and "the rotation shaft 14*a* is positioned downstream with respect to the transport direction center of the transport belt 15" means that the axial center position of the rotation shaft 14*a* is positioned downstream of the center position of the transport belt 15 in the transport direction.

The rotation of the rotation table 14 about the rotation shaft 14*a* is performed by the user operation in the present embodiment, but may be performed by, for example, a motor (not shown). The motor for rotating the rotation table 14 can be controlled by the control section 111 (see FIG. 1). In this case, a configuration may be adopted in which a dedicated motor is provided for each of the first transport section 11 and the second transport section 12, and each independently rotates the rotation table 14.

Figure 7:
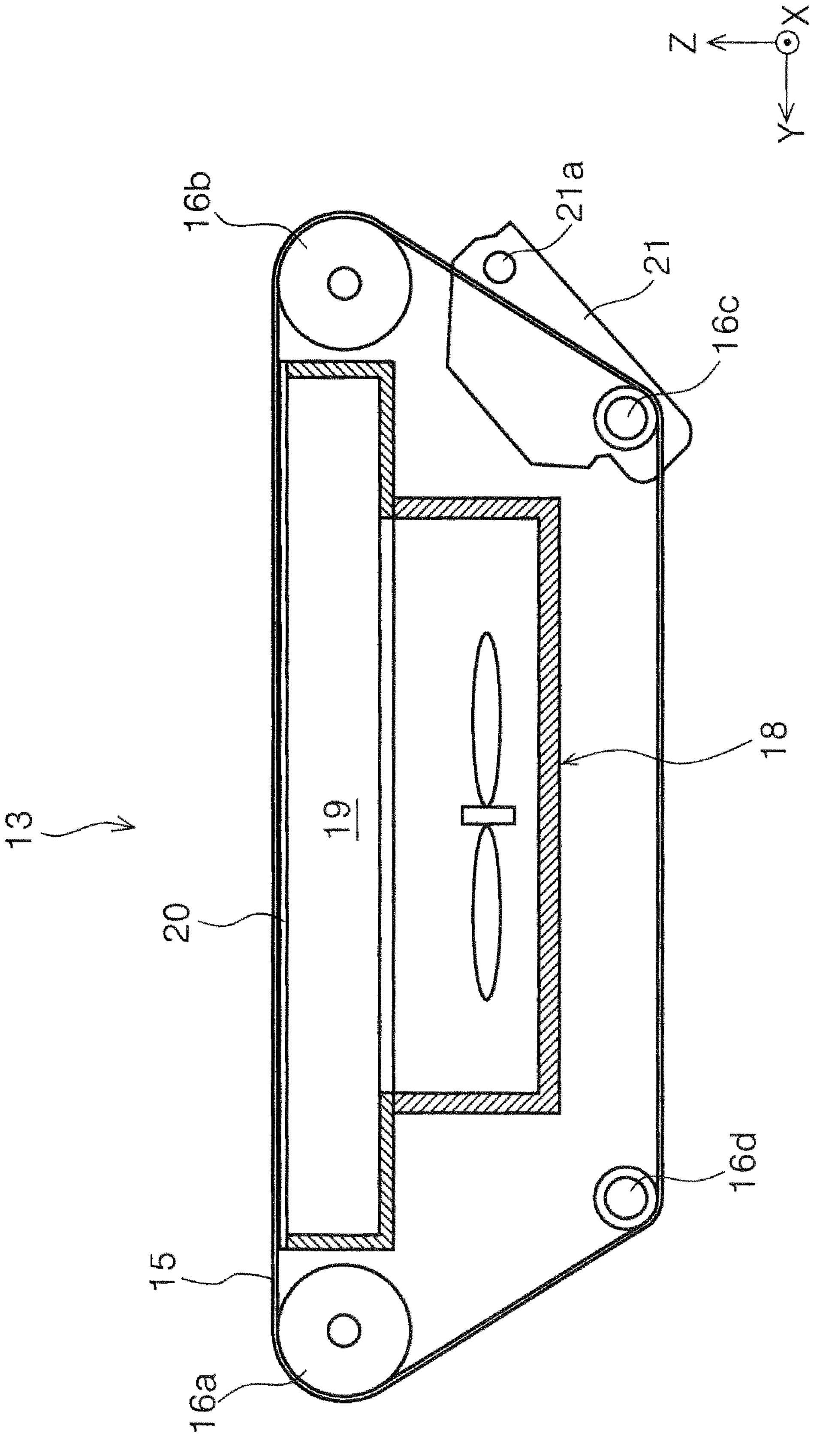
FIG. 7 is a side cross-sectional view of a belt unit.

The belt unit 13 includes a transport belt 15, and is configured to suck and transport the medium to the transport belt 15. More specifically, as shown in FIG. 7 the belt unit 13 includes a drive pulley 16*a* and driven pulleys 16*b*, 16*c*, and 16*d*, and the transport belt 15 is wound around these pulleys. The drive pulley 16*a* is driven in the counterclockwise direction of FIG. 7 by a belt drive motor (not shown), and by this the transport belt 15 circulates in the counterclockwise direction in FIG. 7.

Note that the belt drive motor (not shown) may be provided for each of the first transport section 11 and the second transport section 12, or the first transport section 11 and the second transport section 12 may be driven by one belt drive motor.

The driven pulley 16*c* is supported by a pulley support member 21. The pulley support member 21 is provided so as to be rotatable in the clockwise direction and the counterclockwise direction in FIG. 7 around a rotation shaft 21*a*, and is pressed so as to rotate in the counterclockwise direction in FIG. 7 by a pressing member (not shown), for example, a spring. By this, the driven pulley 16*c* applies tension to the transport belt 15.

A suction blower 18, which is an example of a suction section, is provided inside the transport belt 15. The suction blower 18 applies a negative pressure to the pressure chamber 19.

A suction plate 20 is provided above the pressure chamber 19. The suction plate 20 supports the transport belt 15 between the driven pulley 16*b* and the drive pulley 16*a*. As shown in FIG. 8B, a plurality of openings 20*a* are formed in the suction plate 20.

Figure 8A:
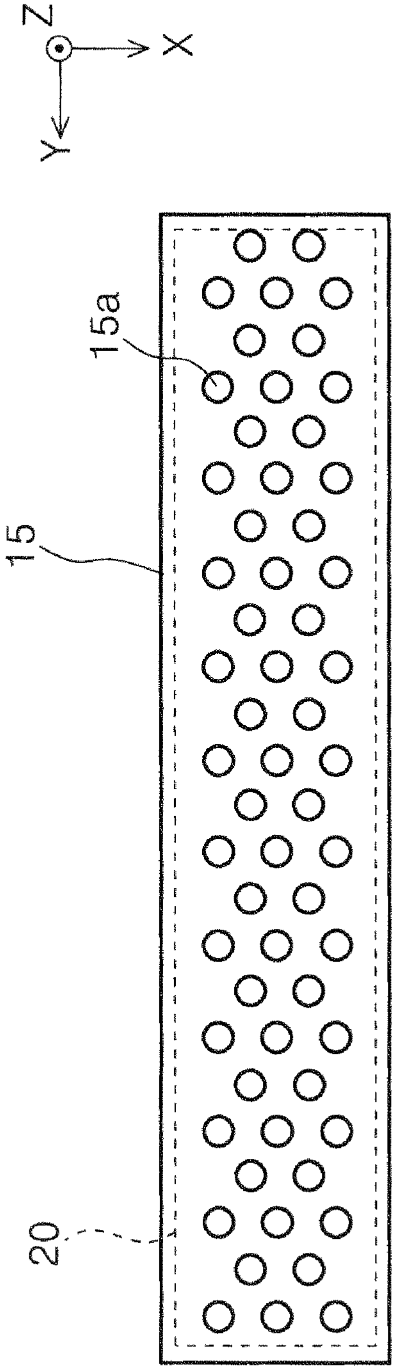
FIG. 8A is a plan view of a transport belt.
Figure 8B:
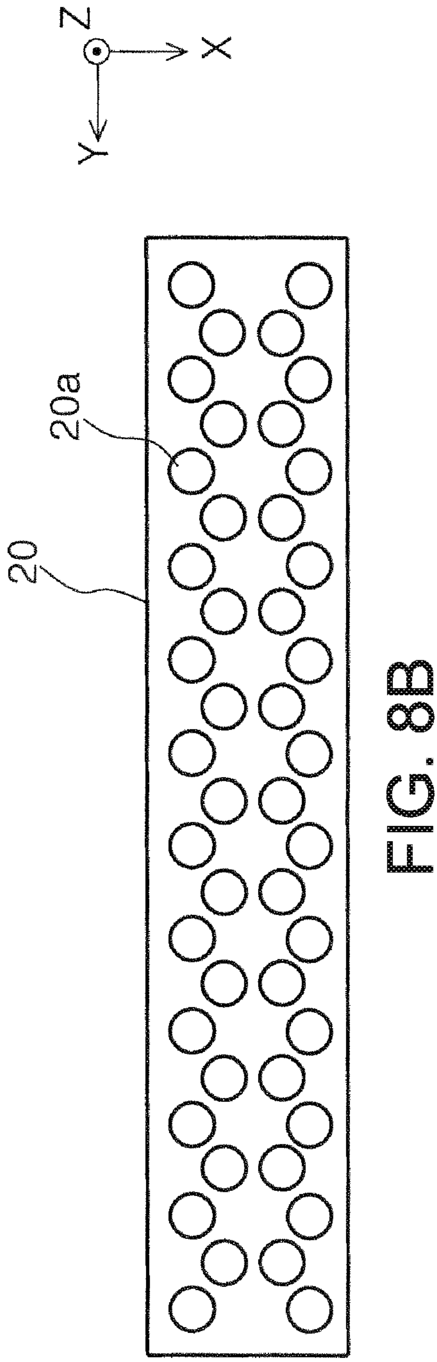
FIG. 8B is a plan view of a suction plate.

A plurality of through holes 15*a* are formed in the transport belt 15 as shown in FIG. 8A, and the through holes 15*a* of the transport belt 15 are configured capable of overlapping the openings 20*a* of the suction plate 20 in accordance with the circulation operation of the transport belt 15. By this, when the negative pressure is formed in the pressure chamber 19 by the suction blower 18, the medium is sucked via the openings 20*a* of the suction plate 20 and the through holes 15*a* of the transport belt 15, and the medium is transported in intimate contact with the transport belt 15.

Note that a suction blower 18, which is an example of a suction section, is provided in each of the first transport section 11 and the second transport section 12 in the present embodiment. That is, since separate suction sections are provided for the first transport belt 15A and the second transport belt 15B, independent suction control can be performed for the first transport belt 15A and the second transport belt 15B.

However, instead of such a configuration, a single suction blower 18 may be used for the first transport section 11 and the second transport section 12.

Figure 9:
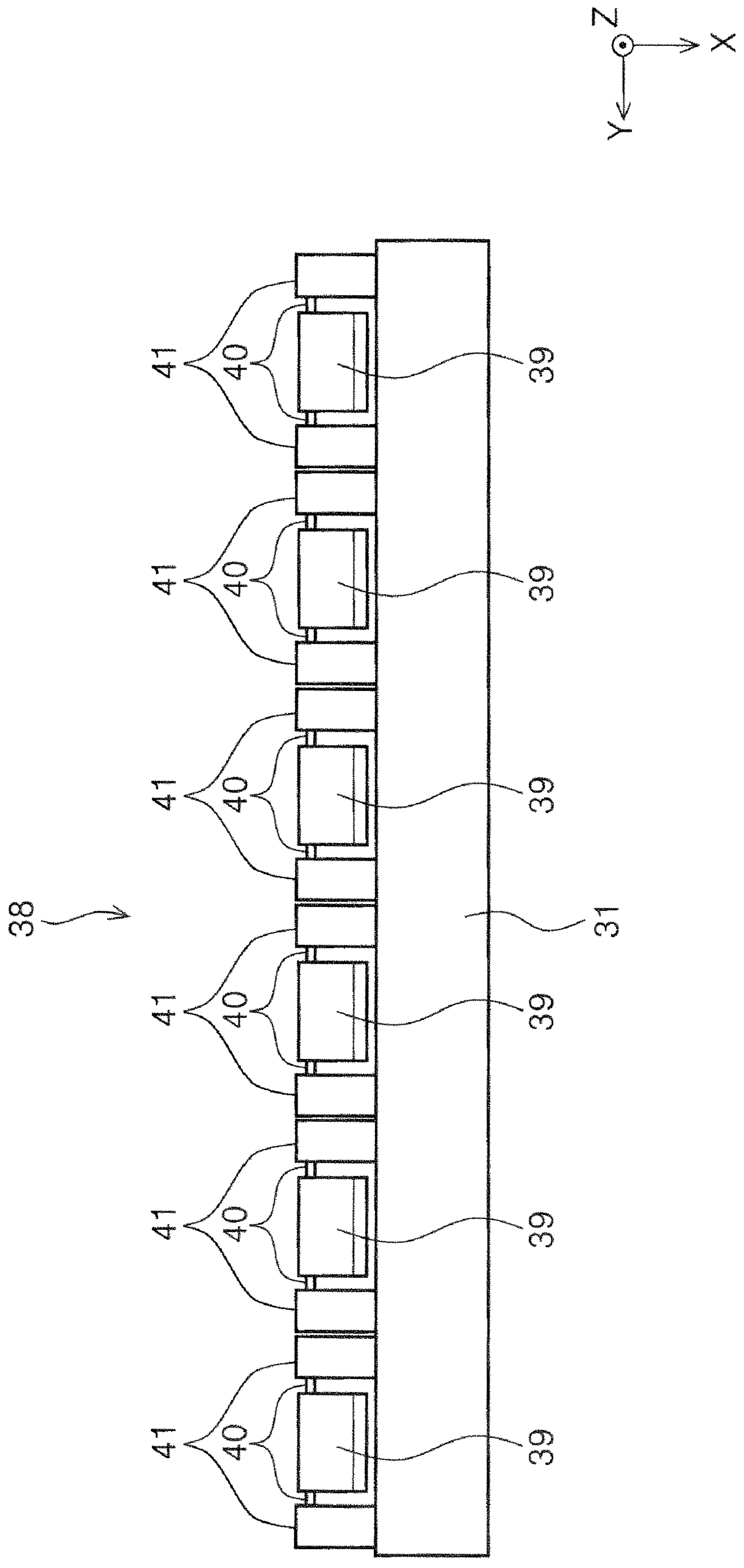
FIG. 9 is a plan view of an upper restriction section.
Figure 19:
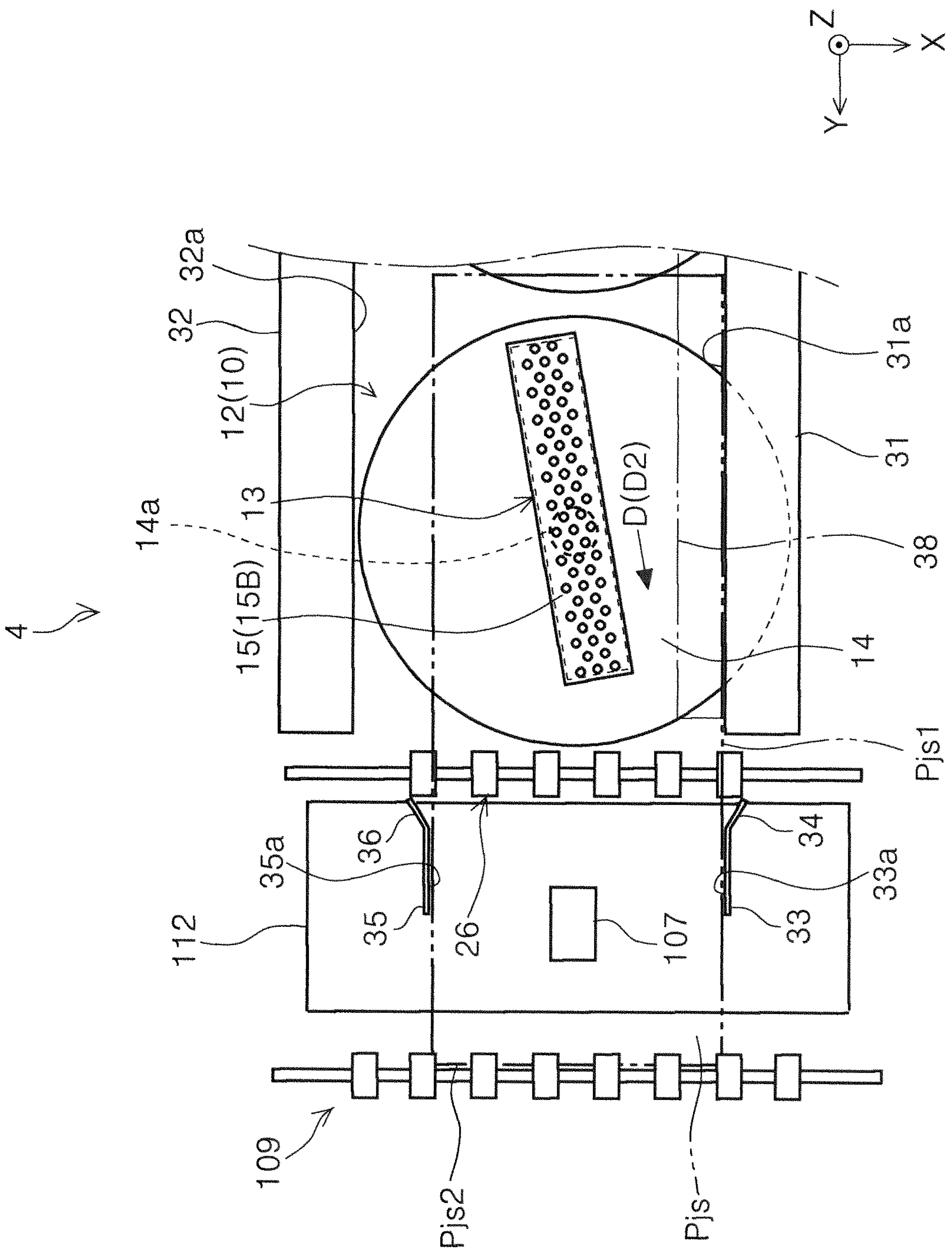
FIG. 19 is a view for explaining a position adjustment method using a correction sheet.

As shown in FIG. 5, the relay transport device 4 is provided with an upper restriction section 38 which suppresses floating of the first edge Ps1 of the medium in the –X direction with respect to the first restriction section 31. In FIG. 19, the upper restriction section 38 is shown in a simplified diagram, and the upper restriction section 38 will be described with reference to FIGS. 9 and 10.

In the present embodiment, the upper restriction section 38 includes a plurality of upper restriction members 39 along the transport direction. Support members 41 are provided on both sides of each upper restriction member 39 in the transport direction, and the upper restriction members 39 are provided rotatably with respect to the support members 41 via rotation shafts 40. The upper restriction members 39 are rotatably provided as viewed from the transport direction, and are provided so as to be able to advance toward and retreat from the medium by rotating. The upper restriction members 39 are pressed by a pressing member (not shown), for example, a spring, in a counterclockwise direction in FIG. 10, that is, a direction in which the upper restriction members 39 are pressed into contact with the medium. The lower surface of the upper restriction member 39 serves as an upper restriction surface 39*a* that restricts the upward movement of the first edge Ps1 facing the first restriction surface 31*a*. The operational effects of the upper restriction section 38 thus configured will be described later.

Figure 6:
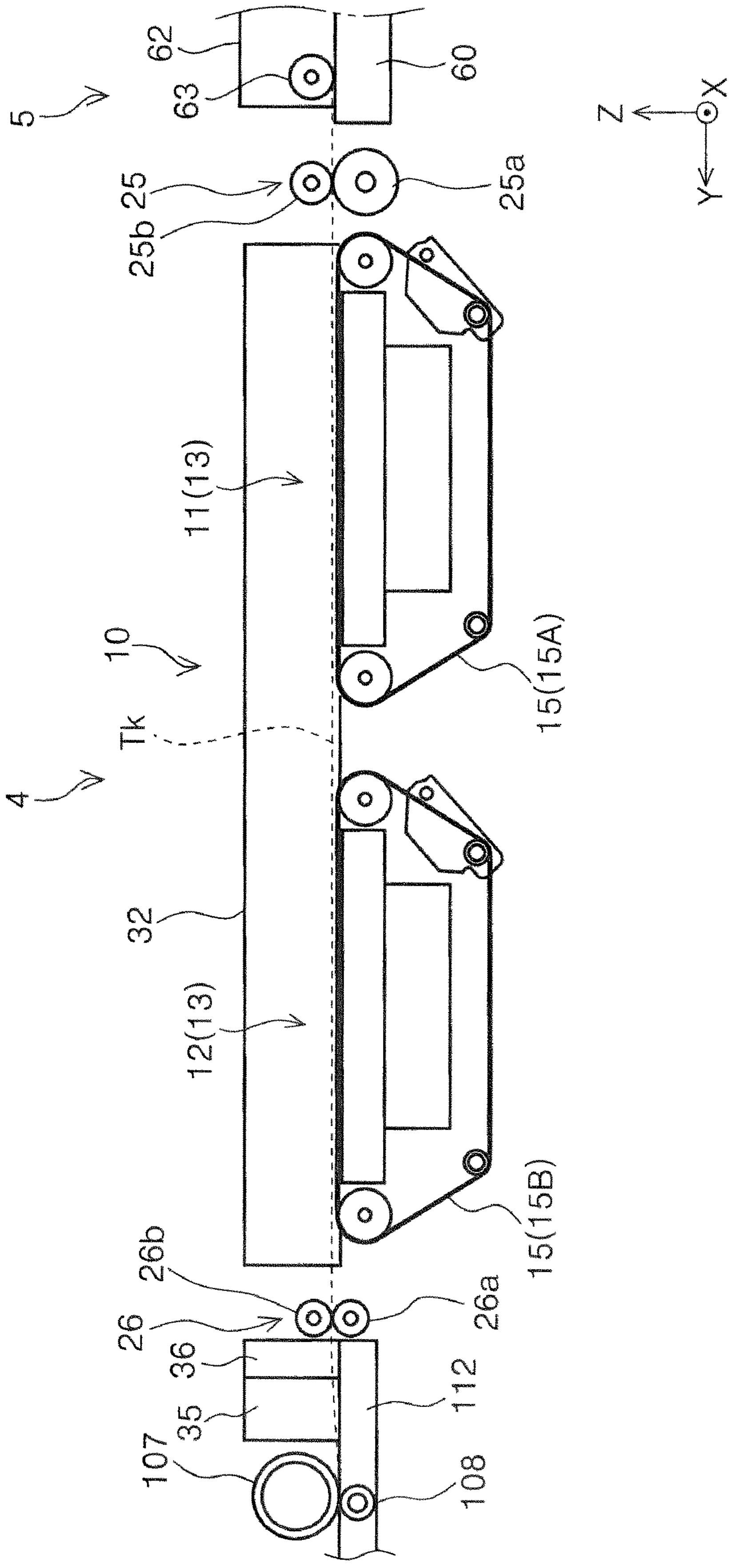
FIG. 6 is a side sectional view of the relay transport device, a portion of the recording device, and a portion of the feeding device.

As shown in FIG. 6, the relay transport device 4 includes a transport roller pair 25 upstream of the transport section 10. The transport roller pair 25 includes a drive roller 25*a* driven by a drive motor (not shown) and a driven roller 25*b* which can be driven to rotate. The drive motor is controlled by the control section 111 (see FIG. 1). The driven roller 25*b* can advance toward and retreat from the drive roller 25*a*, and is pressed toward the drive roller 25*a* by pressing member (not shown), for example, a spring.

In the present embodiment, one pair of the transport roller pair 25 is provided in the width direction as shown in FIG. 5. Although a plurality of transport roller pairs 25 may be provided along the width direction, a configuration in which one transport roller pair 25 is provided in the width direction as in the present embodiment is suitable from the viewpoint that the medium is easily rotated and damage to the medium is suppressed.

That is, the transport roller pair 25 applies a transport force to the medium in the transport direction, but since a transport force in the intersecting direction D, which intersects the transport direction and the width direction, is applied to the medium downstream in the transport section 10, the transport force by the transport roller pair 25 and the transport force by the transport section 10 are simultaneously applied to the medium, and damage such as wrinkles may occur in the medium. However, the configuration in which one transport roller pair 25 is provided in the width direction as in the present embodiment is suitable from the viewpoint that the medium is easily rotated and damage to the medium is suppressed.

As shown in FIG. 6, the relay transport device 4 includes a discharge roller pair 26 downstream of the transport section 10. The discharge roller pair 26 is an example of a medium discharge section that discharges a medium toward the feeding roller 107 of the recording device 3. The discharge roller pair 26 includes a drive roller 26*a* which is driven by a drive motor (not shown) and a driven roller 26*b* which can be driven to rotate. The drive motor is controlled by the control section 111 (see FIG. 1). The driven roller 26*b* is movable back and forth with respect to the drive roller 26*a*, and is pressed toward the drive roller 26*a* by pressing member (not shown), for example, a spring.

In this embodiment, a plurality of discharge roller pairs 26 are provided in the width direction as shown in FIG. 5. By this, it is possible to reliably supply the medium to the recording device 3 while suppressing the medium that has had skew corrected by the relay transport device 4 from becoming skewed again. However, it is not limited to this, and one discharge roller pair 26 may be provided in the width direction.

Note that the drive motor serving as a driving source of the drive roller 26*a* may be the same as or different from the drive roller 25*a* of the transport roller pair 25.

Note that it is desirable that a medium transport speed in the +Y direction by the transport section 10 is higher than a medium transport speed in the +Y direction by the transport roller pair 25 so that the medium does not become loose between the transport roller pair 25 and the transport section 10. Similarly, it is desirable that a medium transport speed in the +Y direction by the discharge roller pair 26 is higher than the medium transport speed in the +Y direction by the transport section 10 so that the medium does not become loose between the transport section 10 and the discharge roller pair 26.

Similarly, it is desirable that a medium transport speed in the +Y direction by the feed roller 107 is higher than the medium transport speed in the +Y direction by the discharge roller pair 26 so that the medium does not become loose between the feed roller 107 and the discharge roller pair 26 of the recording device 3.

In the present embodiment, as shown in FIG. 5, the relay transport device 4 includes a second restriction section 32 capable of restricting the position of a second edge Ps2, which is the opposite side of the medium from the first edge Ps1. The second restriction section 32 has a second restriction surface 32*a* capable of restricting the position of the second edge Ps2 by contacting the second edge Ps2 of the medium. The second restriction surface 32*a* is parallel to the Y-axis direction and extends along the Y-axis direction. In the present embodiment, the second restriction section 32 has a fixed structure that does not move in the width direction, but may be configured to be movable in the width direction.

In the present embodiment, the relay transport device 4 is provided with a first auxiliary guide 33, which is disposed downstream of the first restriction section 31 in the transport direction and which can restrict the position of the first edge Ps1 of the medium, and a second auxiliary guide 35, which is disposed on the opposite side from the first auxiliary guide 33 with the medium interposed therebetween and which can restrict the position of the second edge Ps2 of the medium.

The first auxiliary guide 33 includes a first auxiliary guide surface 33*a* that restricts the position of the first edge Ps1 of the medium. The second auxiliary guide 35 includes a second auxiliary guide surface 35*a* that restricts the position of the second edge Ps2 of the medium. The first auxiliary guide surface 33*a* and the second auxiliary guide surface 35*a* extend along the transport direction.

The first auxiliary guide 33 and the second auxiliary guide 35 are positioned above a medium support section 112 constituting the recording device 3, and are provided so as to be displaceable in a direction approaching each other or separating from each other along the width direction via a rack and pinion mechanism (not shown).

In the present embodiment, the first auxiliary guide 33 is linked to the first restriction section 31 via a linking section (not shown), and when the first restriction section 31 is displaced in the width direction, the first auxiliary guide 33 is also displaced integrally in the width direction. In conjunction with displacement of the first auxiliary guide 33, the second auxiliary guide 35 is also displaced in the width direction.

The distance U5 in the width direction between the first auxiliary guide surface 33*a* and the second auxiliary guide surface 35*a* is shorter than the distance (U3+U4) between the first restriction surface 31*a* and the second restriction surface 32*a*.

The first auxiliary guide 33 includes, at an upstream end in the transport direction, a medium receiving section 34 that widens in a direction (+X direction) away from the first edge Ps1 of the medium with progression upstream in the transport direction. The second auxiliary guide 35 includes, at the upstream end in the transport direction, a medium receiving section 36 that widens in a direction (−X direction) away from the second edge Ps2 of the medium with progression upstream in the transport direction.

Configuration of Feeding Device

Next, the feeding device 5 includes a stack section 60 on which the medium is stacked, and a feed roller 63 as a feeding section that feeds the medium from the stack section 60. A reference symbol P-1 indicates an example of the medium stacked on the stack section 60. The feeding device 5 is supported by the second support base 7 (see FIG. 1) as described above.

As shown in FIG. 5, the feeding device 5 according to the present embodiment includes a first feeding guide 61 having a first feeding guide surface 61*a*, which positions the first edge Ps1 of the medium, and a second feeding guide 62 having a second feeding guide surface 62*a*, which positions the second edge Ps2 of the medium.

The first feeding guide 61 and the second feeding guide 62 are provided displaceable in a direction of approaching each other or separating from each other along the width direction via a rack and pinion mechanism (not shown). The user who sets the medium on the stack section 60 can displace the first feeding guide 61 and the second feeding guide 62 to a position suitable for the size of the medium by operating the first feeding guide 61, for example.

The feed roller 63 is driven in the clockwise direction of FIG. 6 by a motor (not shown). The motor that drives the feed roller 63 is controlled by the control section 111 (see FIG. 1). Note that the feed roller 63 may be provided so as to be switchable between a state of being in contact with the medium stacked on the stack section 60 and a state of being separated from the medium stacked on the stack section 60. Such a state switching operation of the feed roller 63 can be realized by a motor (not shown). The motor can be controlled by the control section 111 (see FIG. 1).

The feed roller 63 is disposed at a second center position X51 (to be described later) in the width direction.

In FIG. 5, a position X43 is a recording reference position in the width direction of the medium in the recording device 3, and is a position that is the center in the width direction of the medium regardless of the medium size, and coincides with the center of the width direction in a state in which the first edge Ps1 of the medium is along the first restriction surface 31*a*. Hereinafter, this is referred to as a first center position X43. The position X51 is a center position in the widthwise direction of the medium (P-1) stacked on the stack section 60, and is referred to as the second center position X51. The position X41 is a position in the width direction of the first restriction surface 31*a* of the first restriction section 31.

The distance U2 between the second center position X51 and the first restriction surface 31*a* in the width direction is longer than the distance U1 between the first center position X43 and the first restriction surface 31*a*.

Note that the position X41 changes according to the size of the medium in the width direction, but the first center position X43 is positioned in the +X direction from the second center position X51 regardless of the size of the medium in the width direction.

Operational Effects of Relay Transport Device

Since the relay transport device 4 includes the first restriction section 31 having the first restriction surface 31*a* for positioning the first edge Ps1 of the medium fed from the feeding device 5 and the transport section 10 for transporting the medium in the intersecting direction D toward the first restriction surface 31*a*, even if the medium fed from the feeding device 5 is skewed, the skew is corrected by the first edge Ps1 contacting the first restriction surface 31*a* by the transport section 10. A medium P-2 that is skewed when supplied from the feeding device 5 to the relay transport device 4 receives transport force in the intersecting direction D from the transport section 10, the first edge Ps1 contacts on the first restriction surface 31*a*, and the first edge Ps1 enters a state of being aligned with the first restriction surface 31*a*, and by this, the skew of the medium is corrected as indicated by reference symbol P-3. By such correction of skew, the position of the medium in the width direction becomes less likely to vary compared with a configuration in which the skew is corrected by bringing the leading edge of the medium into contact with the roller pair. As described above, appropriate recording can be performed in the recording device 3.

The recording device 3 is provided with the registration roller pair 109 for performing skew correction by bringing the leading edge of the medium supplied from the relay transport device 4 into contact therewith, and skew correction is performed by different sections for the recording device 3 and the relay transport device 4, and the skew of the medium is appropriately corrected. In other words, it may be difficult to align the position of the medium in the width direction only by the registration roller pair 109 provided in the recording device 3, and the skew of the medium is appropriately corrected by the skew correction in the relay transport device 4.

In the present embodiment, since the transport belt 15 is configured to suck and transport the medium and bring the medium into contact with the first restriction section 31, the medium is more easily rotated compared to a configuration in which the medium is nipped and transported by the roller pair, and thus it is possible to appropriately correct the skew of the medium.

Note that in the present embodiment, the medium is sucked against the transport belt 15 by air, but the medium may be caused to electrostatically cling to the transport belt 15.

In the present embodiment, since the skew of the medium is corrected by at least two transport belts of the first transport belt 15A and the second transport belt 15B, the transport distance to correct the skew of the medium can be secured, and the skew of the medium can be appropriately corrected.

If the transport distance for correcting the skew of the medium were to be secured by one transport belt, then in order to secure transport distance for correcting the skew of the medium, the distance in the widthwise direction between the first restriction surface 31*a* and the transport belt would become great upstream in the transport direction, and the force for pressing the first edge Ps1 against the first restriction surface 31*a* would be weak. If the inclination angle of the transport belt with respect to the transport direction were made small in order to suppress such a problem, the effect of correcting the skew would be reduced, so that the transport distance would need to be lengthened, resulting in an increase in the size of the device. However, by correcting the skew of the medium using at least two transport belts, that is, the first transport belt 15A and the second transport belt 15B, the first edge Ps1 can be appropriately pressed against the first restriction surface 31*a*, thereby suppressing an increase in the size of the device.

Note that it goes without saying that three or more transport belts may be provided along the transport direction.

In the present embodiment, it is possible to stably transport the medium because the second direction D2, which is the direction in which the second transport section 12 transports the medium toward the first restriction section 31, is a direction along the first direction D1, which is the direction in which the first transport transports the medium toward the first restriction section 31.

In the present embodiment, since the first direction D1 and the second direction D2 can be changed, appropriate skew correction can be performed.

In the present embodiment, since the first restriction section 31 is movable in the width direction, it is possible to correct the skew of a plurality of types of medium having different sizes in the width direction.

In the present embodiment, since the rotation table 14, that is, the transport belt 15 can change the intersecting direction D by rotation of the rotation shaft 14*a*, it is possible to perform more appropriate skew correction by changing the intersecting direction according to the quality of the skew correction of the medium.

The rotation of the transport belt 15 around the rotation shaft 14*a* may be performed by a power of a motor (not shown) under the control of the control section 111 (see FIG. 1). In this case, change in the intersecting direction D may be controlled in accordance with the medium size or a medium type. For example, the lower the rigidity of the medium, the more likely that bending will occur when the first edge Ps1 comes into contact with the first restriction section 31, so that skew is less likely to be corrected or the medium is more likely to be damaged, so it is desirable that the lower rigidity of the medium, the smaller the angle formed by the transport direction (Y-axis direction) and the intersecting direction D.

As described above, when the transport force in the +Y direction by the transport roller pair 25 and the transport force in the intersecting direction D by the transport section 10 are applied to the medium at the same time, the medium may be damaged such as by wrinkling. For this reason, the angle formed by the transport direction (Y-axis direction) and the intersecting direction D may be made smaller in accordance with longer length of the medium in the transport direction.

The crossing direction D may be changed during transport of the medium, and for example, the angle formed by the transport direction (Y-axis direction) and the intersecting direction D may be increased as the transport of the medium proceeds. This makes it possible to appropriately correct the skew while suppressing the above described damage.

In the present embodiment, since the rotation center of the transport belt 15 is downstream of the transport belt 15 in the transport direction, the following operational effects are obtained. These operational effects will be described below with reference to FIG. 11. Note that, of the configuration shown in FIG. 5, only that necessary for description may be shown, and may be simplified as appropriate, in FIGS. 11A and 11B and the subsequent drawings.

Figure 11A:
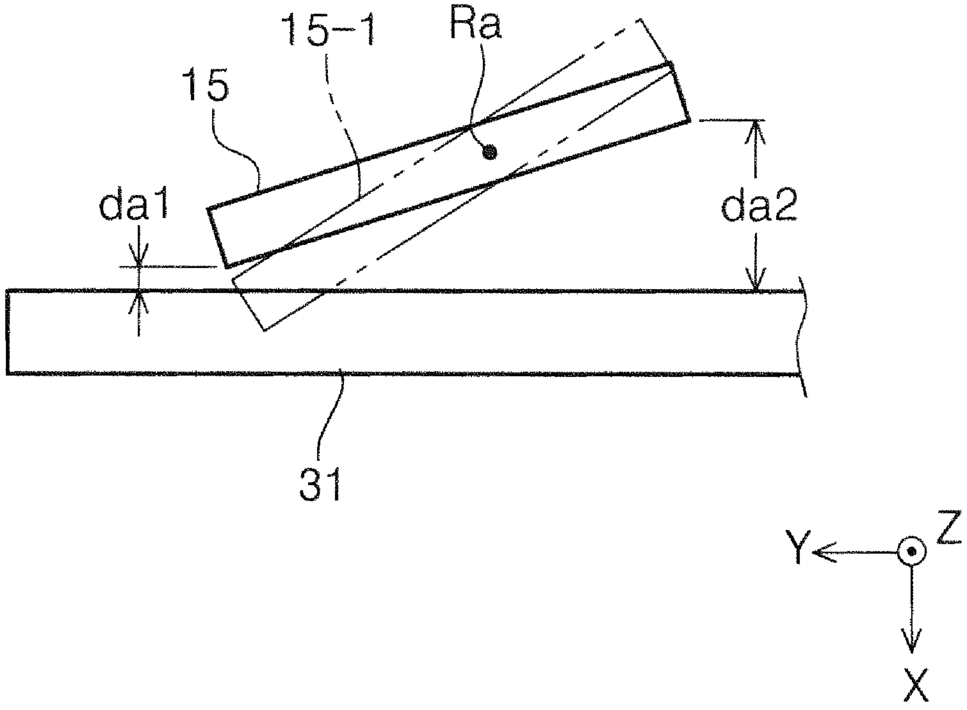
FIG. 11A is a plan view of a configuration in which the center of rotation of the transport belt is upstream in the transport direction.
Figure 11B:
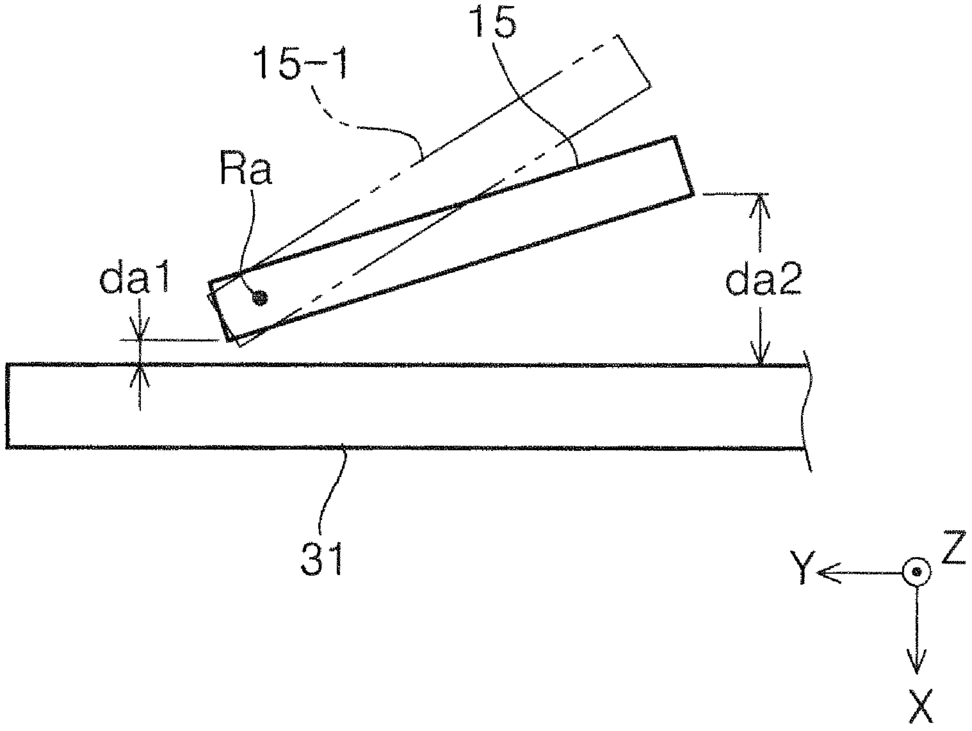
FIG. 11B is a plan view of a configuration in which the rotation center of the transport belt is downstream in the transport direction.

FIG. 11A shows, as a comparative example, a case where the rotation center Ra when the transport belt 15 rotates is located upstream of the transport belt 15 in the transport direction. In order for the transport belt 15 to transport the medium toward the first restriction section 31, distance da1 between a downstream end of the transport belt 15 and the first restriction section 31 in the width direction is shorter than distance da2 between an upstream end of the transport belt 15 and the first restriction section 31. For this reason, when the transport belt 15 rotates in plan view in order to change the intersecting direction D, there is a concern that the downstream end of the transport belt 15 and the first restriction section 31 interfere with each other, and this limits the rotatable range of the transport belt 15, so that the adjustment range in the intersecting direction would is narrowed. In FIGS. 11A and 11B, the transport belt 15 indicated by the reference numeral 15-1 and two dot chain line is rotated by 15° in the counterclockwise direction of the drawing from the transport belt 15 indicated by the solid line. In the case of FIG. 11A, the downstream end of the transport belt 15 interferes with the first restriction section 31. In order to bring the first edge Ps1 of the medium into contact with the first restriction surface 31*a*, the upper surface of the transport belt 15 needs to be positioned above (+Z direction) the lower end section of the first restriction surface 31*a* in the height direction (Z-axis direction) of the first restriction surface 31*a*, so a configuration in which the downstream end of the transport belt 15 interferes with the first restriction section 31 in the plan view as shown in FIG. 11A cannot be adopted.

However, in the present embodiment, the rotation center Ra of the transport belt 15 is positioned downstream of the transport belt 15 in the transport direction, so the swing range of the downstream end when the transport belt 15 rotates can be made narrower than the swing range of the upstream end, thereby making it difficult for the downstream end of the transport belt 15 to interfere with the first restriction section 31 as shown in FIG. 11B. Therefore, the rotatable range of the transport belt 15 can be expanded, and the adjustable range in the intersecting direction D can be expanded.

In the present embodiment, the second restriction section 32 having the second restriction surface 32*a* capable of restricting the position of the second edge Ps2 of the medium is provided. By this, the following operational effects can be obtained. That is, the medium is moved to the side of the first restriction surface 31*a* by the transport belt 15. However, as an example, when the medium rotates so that the downstream end of the first edge Ps1 separates from the first restriction surface 31*a*, there is a concern that the correction of the skew cannot be performed even when the medium is transported by a distance transportable by the transport belt 15. Note that this is merely an example, and there are cases where the medium may move in a direction away from the first restriction surface 31*a* without being rotated as described above. Movement of the medium in the direction away from the first restriction surface 31*a* can also be caused by the medium receiving a reaction force from the first restriction surface 31*a* when contacting the first restriction surface 31*a*. However, in the present embodiment, since the second restriction section 32 capable of restricting the position of the second edge Ps2 of the medium is provided, it is possible to suppress the occurrence of the defects described above.

Further, in the present embodiment, as shown in FIG. 5, the second distance U4 between the first center position X43 and the position X42 of the second restriction surface 32*a* in the width direction is longer than the first distance U3 between the first center position X43 and the position X41 of the first restriction surface 31*a*. By this it is possible to appropriately receive the skewed medium from the feeding device 5.

Although the position X41 varies depending on the size of the medium in the width direction, the position of the second restriction section 32 in the width direction is set such that the second distance U4 is longer than the first distance U3 even when the widest medium recordable by the recording device 3 is transported.

Figure 10:
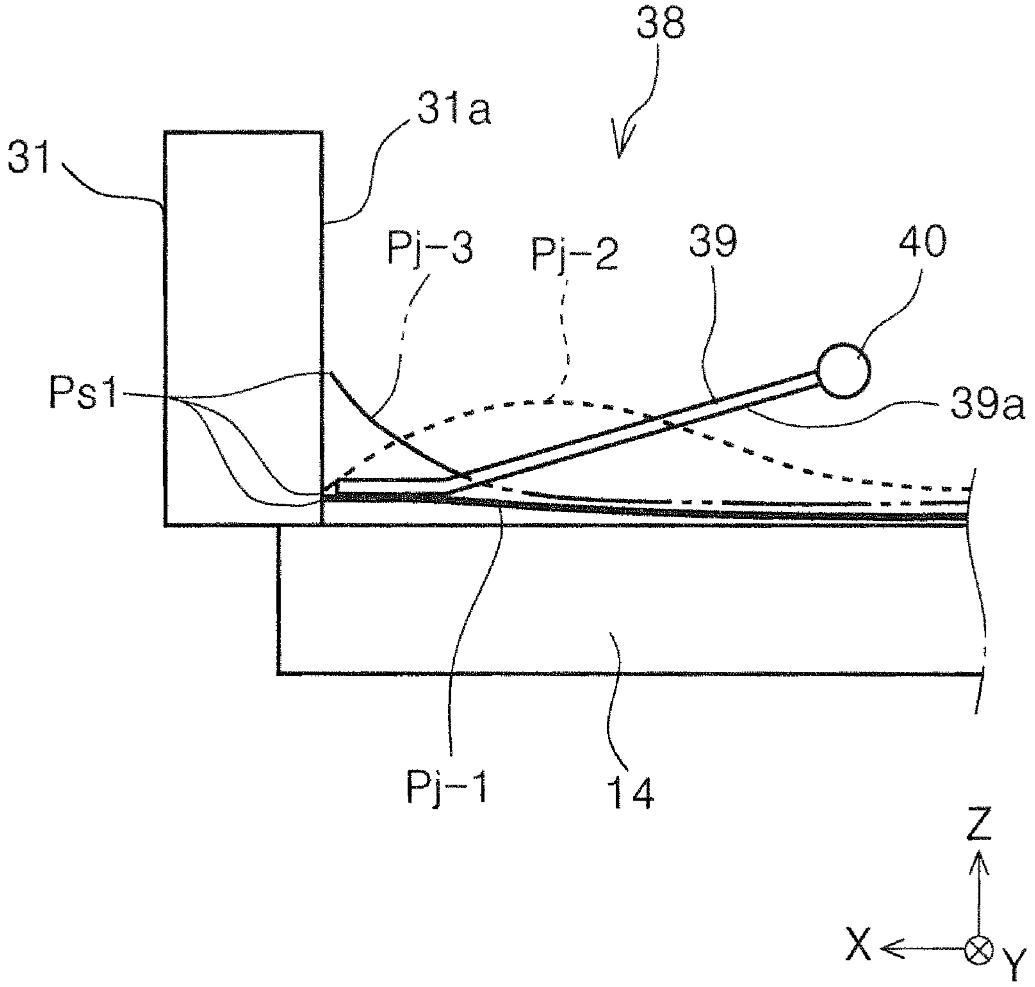
FIG. 10 is a view of the upper restriction section as viewed in a transport direction.

In the present embodiment, since the upper restriction members 39 (upper restriction surface 39*a*) are provided as the upper restriction section 38 which restricts the upward movement of the medium, the following operational effects are obtained. That is, if the medium deforms when the first edge Ps1 of the medium comes into contact with the first restriction surface 31*a*, then the medium will not rotate, and there is a concern that the skew of the medium cannot be appropriately corrected, and there is also a concern that a jam occurs. In FIG. 10, reference symbol Pj-3 is an example of medium wherein the first edge Ps1 deformed or curled upward so as to move up the first restriction section 31. In FIG. 10, reference symbol Pj-2 is an example of the medium wherein a side end section including the first edge Ps1 deformed or curled downward. Regardless of whether the medium is Pj-2 or Pj-3, there is a possibility that the medium cannot be appropriately rotated due to the deformation.

However, in the present embodiment, since the upper restriction surface 39*a* that restricts the upward movement of the medium is provided, the first edge Ps1 can appropriately come into contact with the first restriction surface 31*a* as does the medium indicated by the reference symbol Pj-1, and thus the skew can be corrected by appropriately rotating the medium.

Since the upper restriction members 39 forming the upper restriction surface 39*a* are rotatably provided so that the upper restriction surface 39*a* can advance toward and retreat from the medium, it is possible to suppress damage from being formed on the medium, by the upper restriction members 39 rotating when receiving a strong reaction force from the medium.

The upper restriction members 39 are pressed by a pressing member (not shown), for example, a spring, in a direction in which the upper restriction surface 39*a* advances toward the medium. By this, it is possible to suppress the upper restriction members 39 from being easily rotated when the upper restriction members 39 receive reaction force from the medium, and by this it is possible to appropriately correct the skew of the medium.

In the present embodiment, since the plurality of upper restriction members 39 are provided along the transport direction, it is possible to restrict the upward movement of the medium in a wider range along the transport direction.

Since the plurality of upper restriction members 39 are provided along the transport direction, even in a case where the degree of upward movement of the medium different depends on the position in the transport direction, the upper restriction surface 39*a* can be displaced according to the position in the transport direction, and thus it is possible to suppress damage from being formed on the medium due to the medium coming into strong contact with the upper restriction surface 39*a*.

Note that from the viewpoint of suppressing excessive pressing of the medium, it is desirable that the upper restriction members 39 form a predetermined gap between the upper restriction members 39 and the rotation table 14 that supports the medium from below, and be able to maintain the state. It is desirable that the predetermined gap is, for example, a value obtained by adding a predetermined margin to the maximum value of the thickness of the medium per sheet.

The upper restriction members 39 may have a fixed structure which does not advance toward and retreat from the medium. When the plurality of upper restriction members 39 are provided along the transport direction, the predetermined gap may be different among the plurality of upper restriction members 39. For example, the predetermined gap may be made smaller downstream, where the skew of the medium is corrected, than upstream.

Further, instead of the configuration in which the plurality of upper restriction members 39 are provided at appropriate intervals along the transport direction, one upper restriction member extending along the transport direction may be used.

In this embodiment, as shown in FIG. 5, it is configured so that the distance U2 in the width direction between the second center position X51 and the first restriction surface 31*a* is longer than the distance U1 between the first center position X43 and the first restriction surface 31*a*. By this, it is possible to suppress the medium from being caught on the first restriction section 31 when the medium is supplied from the feeding device 5 to the relay transport device 4.

Note that in the present embodiment, the first feeding guide 61 and the second feeding guide 62 are members which are displaced by the user according to the size of the medium in the width direction, and the first restriction section 31 is also a member which is displaced by the user according to the size of the medium in the width direction. Therefore, in the present embodiment, the first feeding guide 61 and the first restriction section 31 are linked to each other by a linking member (not shown) so that the distance U2 is longer than the distance U1, and the first feeding guide 61 and the first restriction section 31 are configured to be integrally displaced.

However, even when the first feeding guide 61 and the first restriction section 31 are not linked by the linking member (not shown), the distance U2 can be made longer than the distance U1 if, as an example, the movable region of the first feeding guide 61 is set to be in the −X direction from the movable region of the first restriction section 31.

Note that in a configuration in which the first feeding guide 61 and the first restriction section 31 are not coupled, a detection member for detecting the position of the first restriction section 31 in the width direction and a detection member for detecting the position of the first feeding guide 61 in the width direction are provided, and when the distance U2 is equal to or less than the distance U1 based on the detection information of the two detection members, the control section 111 (see FIG. 1) can place the medium feeding operation on hold and display an alert to that effect on a display section (not shown) provided in the recording device 3.

In a case where the first restriction section 31 is configured to be displaced by the power of a motor (not shown) under a control of the control section 111 (refer to FIG. 1), the position of the first restriction section 31 may be controlled such that the distance U2 is longer than the distance U1 according to the medium size recognized by the control section 111. In this case, in order to detect that the first feeding guide 61 is at an appropriate position corresponding to the medium size, it is also desirable to provide the detection member that detects the position of the first feeding guide 61 in the width direction. When, based on the detection information of the detection member, the control section 111 determines that the first feeding guide 61 is not at the appropriate position corresponding to the medium size, it can put the medium feeding operation on hold and display the alert to that effect on the display section (not shown) included in the recording device 3.

In the present embodiment, the feed roller 63, which is the feeding section of the feeding device 5, can feed the medium by coming into contact with the second center position X51 of the medium in the width direction. By this it is possible to suppress skew of the medium which is fed from the feeding device 5.

In the present embodiment, the feeding device 5 includes the first feeding guide 61 which positions the first edge Ps1 of the medium, and the first feeding guide surface 61*a* of the first feeding guide 61 is positioned with respect to the width direction between the first restriction surface 31*a* of the first restriction section 31 and the first center position X43. By this it is possible to suppress the position of the first edge Ps1 of the medium (P-1) fed from the feeding device 5 from being close to the first restriction section 31, and it is possible to suppress the medium from being caught on the first restriction section 31 when the medium is supplied from the feeding device 5 to the relay transport device 4.

The distance between the first restriction surface 31*a* and the first feeding guide surface 61*a* in the width direction does not become longer than necessary, and the medium can appropriately contact the first restriction section 31 after being supplied from the feeding device 5 to the relay transport device 4, and thus the skew of the medium can be appropriately corrected.

In the present embodiment, since the feeding device 5 is further provided with the second feeding guide 62 having the second feeding guide surface 62*a* which can restrict the position of the second edge Ps2 of the medium, it is possible to suppress skew of the medium fed from the feeding device 5. In FIG. 5, since the second center position X51 is at an intermediate position between the first feeding guide surface 61*a* of the first feeding guide 61 and the second feeding guide surface 62*a* of the second feeding guide 62 in the width direction, it is possible to more favorably suppress skew of the medium fed from the feeding device 5.

Note that even in a configuration in which the first feeding guide 61 and the second feeding guide 62 are not provided, the medium can be sent out from the stack section 60 as long as the stack section 60 and the feed roller 63 are provided.

In the present embodiment, the medium which had its skew corrected by the first restriction section 31 is supplied to the recording device 3 in a state of being interposed between the first auxiliary guide 33 and the second auxiliary guide 35 in the width direction. By this, skew of the medium when the medium is supplied from the relay transport device 4 to the recording device 3 is suppressed, and the medium can be supplied to the recording device 3 in a state in which the skew correction effect from the relay transport device 4 is appropriately maintained.

In the present embodiment, since the first auxiliary guide 33 includes the medium receiving section 34 at the upstream end in the transport direction, it is possible to suppress the medium from being caught on the first auxiliary guide 33. Since the second auxiliary guide 35 includes the medium receiving section 36 at the upstream end in the transport direction, it is possible to suppress the medium from being caught on the second auxiliary guide 35.

In the present embodiment, the first restriction section 31, the first auxiliary guide 33, and the second auxiliary guide 35 are movable in the width direction. By this, the skew can be appropriately corrected in accordance with the medium size in the width direction.

The first restriction section 31 and the first auxiliary guide 33 are integrally movable in the width direction. By this, it is possible to prevent the first restriction section 31 and the first auxiliary guide 33 from being displaced in the width direction, and it is possible to suppress the medium from being caught on the first auxiliary guide 33 when the medium moves from the first restriction section 31 to the first auxiliary guide 33.

However, the first restriction section 31 and the first auxiliary guide 33 are not limited to being integrated, and may be separate bodies.

In the present embodiment, the distance U5 between the first auxiliary guide surface 33*a* and the second auxiliary guide surface 35*a* in the width direction is shorter than the distance (U3+U4) between the first restriction surface 31*a* and the second restriction surface 32*a*. By this, it is possible to suitably suppress skew when the medium is supplied from the relay transport device 4 to the recording device 3.

Modifications of Relay Transport Device

The relay transport device 4 described above can be modified as in the following modification 1 to modification 13. Note that the modifications described below may be combined in any manner as long as there is no technical contradiction.

Modification 1

In the above described embodiment, displacement of the first restriction section 31 in the width direction is performed by a manual operation of the user. However, for example, a configuration may be adopted in which the first restriction section 31 is displaced in the width direction using a rack and pinion mechanism (not shown) driven by a motor (not shown). The motor for displacing the first restriction section 31 can be controlled by the control section 111 (see FIG. 1). Since the control section 111 can recognize the medium size based on the print data, it is possible to displace the first restriction section 31 to an appropriate position according to the medium size.

Modification 2

The transport belt 15 may be configured to be movable in the width direction in conjunction with the movement of the first restriction section 31. For example, in the above described embodiment, by integrally configuring the transport section 10 and the first restriction section 31, it is possible to move the transport belt 15 in the width direction in conjunction with movement of the first restriction section 31.

By this, the following operational effects can be obtained. That is, when the distance between the transport belt 15 and the first restriction surface 31*a* in the width direction is long, there is a possibility that the first edge Ps1 of the medium cannot be appropriately brought into contact with the first restriction surface 31*a* by the transport belt 15. On the other hand, when the distance between the transport belt 15 and the first restriction surface 31*a* in the width direction is short, in a case where the medium has a large size in the width direction, then a region which deviates from the transport belt 15 in the −X direction increases, and as a result, there is a concern that the medium cannot be appropriately transported. Therefore, in order to appropriately transport the medium while appropriately correcting the skew of the medium, the distance between the transport belt 15 and the first restriction surface 31*a* in the width direction is important. However, by making the transport belt 15 movable in the width direction in conjunction with the movement of the first restriction section 31, it is possible to appropriately maintain the distance between the transport belt 15 and the first restriction surface 31*a* in the width direction, and thus it is possible to appropriately correct the skew of the medium and appropriately transport the medium.

Modification 3

A plurality of transport belts 15 may be provided in the width direction. By providing a plurality of transport belts 15 in the width direction, it is possible to appropriately transport a medium having a large size in the width direction. Note that when a plurality of transport belts 15 are provided in the width direction, the number of the transport belts 15 is not limited to two in the transport direction, and three or more transport belts 15 may be provided in the transport direction.

Note that in a case where a plurality of transport belts 15 are provided in the width direction, the suction force for sucking the medium by each transport belt 15 may be set to be weaker.

Modification 4

The difference between the first distance U3 and the second distance U4 of FIG. 5 may be made variable by providing the second restriction section 32 so as to be movable along the widthwise direction. By this, the difference between the first distance U3 and the second distance U4 can be adjusted according to the degree of skew of the medium received from the feeding device 5, and more appropriate skew correction can be performed. Note that the greater the difference between the first distance U3 and the second distance U4, the larger the degree of medium skew that can be received, and the smaller the difference between the first distance U3 and the second distance U4, the more easily that the medium can be regulated between the first restriction section 31 and the second restriction section 32, so that the position in the width direction is more easily determined, and skew can be suppressed.

More specifically, the second distance U4 is desirably as short as possible in order to appropriately correct the skew of the medium, because the distance in the transport direction in which the medium can be transported by the transport belt 15 is limited. However, if the second distance U4 is shortened, the medium cannot be appropriately received when the degree of skew of the medium received from the feeding device 5 is large. Therefore, it is possible to perform more appropriate skew correction by adjusting the difference between the first distance U3 and the second distance U4 according to the skew of the medium received from the feeding device 5.

Note that the movement of the second restriction section 32, that is, the change of the second distance U4 may be manually performed by the user or may be automatically performed. In a case where the second distance U4 is automatically changed, for example, it is possible to adopt a configuration in which the second restriction section 32 is displaced in the width direction by a rack and pinion mechanism (not shown) operated by a motor (not shown), and the control section 111 (refer to FIG. 1) controls the motor according to the medium size. For example, since the degree of skew of the medium received from the feeding device 5 tends to increase as the medium size in the transport direction decreases, it is desirable that the control section 111 (see FIG. 1) decreases the difference between the first distance U3 and the second distance U4 according to decrease in the medium size in the width direction.

Modification 5

The suction force of the medium by the transport belt 15 in a first region may be weaker than the suction force in a second region that is downstream in the transport direction from the first region. By this, in the first region where the necessity of the skew correction is high, the medium is more easily rotated than in the second region, and the skew correction can be appropriately performed. In addition, it is possible to reliably suck the medium in the second region Ar2 where it is desirable to reliably supply the medium to the recording device, and it is possible to appropriately supply the medium to the recording device 3.

Note that the suction force may be changed in any manner as long as the suction force per unit area in the transport belt 15 is different between the first region and the second region. For example, a suction blower 18 may be provided for each of the first region and the second region, and the suction force may be made different by adjusting the rotational speed of the suction blowers 18.

The suction force may be varied by adjusting the size of the openings 20*a* of the suction plate 20.

Modification 6

In the configuration in which the transport roller pair 25 for transporting the medium to the first transport belt 15A is provided upstream the transport direction from the first transport belt 15A as in the present embodiment, the suction force of the medium by the first transport belt 15A, or the suction force of the medium by the first transport belt 15A and the suction force of the medium by the second transport belt 15B, may be changeable.

That is, in a case where the transport roller pair 25 is provided upstream of the first transport belt 15A in the transport direction, it is difficult for the medium to rotate while the medium is nipped by the transport roller pair 25, and there is a concern that damage such as wrinkling will occur in the medium due to the restraining action of the transport roller pair 25 and the rotating action of the first transport belt 15A being simultaneously applied to the medium. Depending on the length of the medium in the transport direction, the rotating action of the second transport belt 15B may be applied at the same time, which may cause the damage.

Therefore, by making it possible to change the suction force applied to the medium by the first transport belt 15A, or the suction force applied to the medium by the first transport belt 15A and the suction force applied to the medium by the second transport belt 15B, it is possible to weaken the suction force applied to the medium by the first transport belt 15A, or the suction force applied to the medium by the first transport belt 15A and the suction force applied to the medium by the second transport belt 15B, when there is a risk of damage as described above, and thus it is possible to suppress the damage described above.

Note that the suction force can be adjusted by adjusting the rotational speed of the suction blower 18. The adjustment of the suction force may be performed by the user through an operation panel (not shown), or may be automatically performed under the control of the control section 111 (see FIG. 1) according to conditions such as the medium type and the medium size.

For example, since the damage as described above is more likely to occur the longer that the length of the medium is in the transport direction, it is desirable to make the suction force weaker according to the length of the medium in the transport direction, that is, as the length of the medium is longer. For example, when there is a first medium and a second medium whose length in the transport direction is longer than that of the first medium, a first suction force is used when the first medium is transported, and a second suction force weaker than the first suction force is used when the second medium is transported. Since such damage is more likely to occur as the rigidity of the medium is lower, when there is the first medium and the second medium having a rigidity lower than that of the first medium, the first suction force is used when the first medium is transported, and the second suction force weaker than the first suction force is used when the second medium is transported.

In this case, both the first transport belt 15A and the second transport belt 15B may be used as the second suction force, or only the first transport belt 15A may be used as the second suction force. Further, the second suction force may be applied only to the upstream section of the first transport belt 15A.

The suction force may be set to the second suction force until a trailing edge of the second medium in the transport direction passes through the transport roller pair 25, and the suction force may be set to the first suction force when the trailing edge of the second medium in the transport direction passes through the transport roller pair 25.

Modification 7

Regardless of the length of the medium, it is also desirable that the suction force of the medium by the first transport belt 15A be made weaker than the suction force of the medium by the second transport belt 15B. By this, the medium rotates more easily in the region of the first transport belt 15A where there is a high need for skew correction, than in the region of the second transport belt 15B, and skew correction can be performed appropriately. In the region of the second transport belt 15B where the medium is to be reliably transferred to the discharge roller pair 26, the medium is less likely to rotate than in the region of the first transport belt 15A, but the transport force is large, and the medium can be appropriately transferred to the discharge roller pair 26.

Modification 8

In a configuration in which the transport roller pair 25 that transports the medium to the first transport belt 15A is provided upstream in the transport direction with respect to the first transport belt 15A as in the present embodiment, the transport roller pair 25 may be configured to be switchable between the nip state in which the transport roller pair 25 nips the medium and the nip release state in which the transport roller pair 25 releases the nip, and in this case, the transport roller pair 25 may be switched to the nip release state after a portion of the medium transported by the transport roller pair 25 in the nip state is sucked by the first transport belt 15A. By this, the following operational effects can be obtained.

That is, it is difficult for the medium to rotate while the medium is nipped by the transport roller pair 25, and there is a concern that damage such as wrinkling will occur in the medium due to the restraining action of the transport roller pair 25 and the rotating action of the first transport belt 15A being simultaneously applied to the medium.

However, since the transport roller pair 25 is switched to the nip release state after a portion of the medium transported by the transport roller pair 25 in the nip state is sucked to the first transport belt 15A, it is possible to shorten a period in which the restraining action by the transport roller pair 25 and the rotating action by the first transport belt 15A are simultaneously applied to the medium, and it is possible to suppress the damage as described above.

Note that the timing of switching the transport roller pair 25 from the nip state to the nip release state may be changed according to type of the medium. For example, since in a case where the rigidity of the medium is high, the above described damage is less likely to occur than in a case where the rigidity is relatively low, in the case of the medium having high rigidity, the timing of switching the transport roller pair 25 from the nip state to the nip release state may be delayed. By this, the medium can be reliably transported downstream by the transport roller pair 25.

Note that after a portion of the medium transported by the transport roller pair 25 in the nip state is sucked to the first transport belt 15A, it is desirable that the restraint of the medium by the feed roller 63 of the feeding device 5 is released when the transport roller pair 25 is switched to the nip release state. This is because when the medium is restrained by the feed roller 63 of the feeding device 5, the medium is difficult to rotate, and there is a concern that damage such as wrinkles described above may occur.

Here, the state in which "the restraint of the medium by the feed roller 63 is released" means a state, such as a state in which the feed roller 63 is not in contact with the medium, in which the above described damage is unlikely to occur in the medium due to force received from the feed roller 63 when the medium is about to rotate due to the action of the first transport belt 15A. Therefore, in a case where the feed roller 63 can be switched between a state of being in contact with the medium stacked on the stack section 60 and a state of being separated from the medium stacked on the stack section 60, it is desirable to separate the feed roller 63 from the medium when the leading edge of the medium is nipped by the transport roller pair 25.

Modification 9

Regarding the first direction D1, which is the transport direction by the first transport belt 15A, and the second direction D2, which is the transport direction by the second transport belt 15B, the angle formed by the +Y direction, that is, the transport direction and the second direction D2 may be smaller than the angle formed by the transport direction and the first direction D1.

By this, in the region of the first transport belt 15A where the need for skew correction is high, the effect of skew correction is higher than that in the region of the second transport belt 15B, and skew correction can be performed appropriately. In the region of the second transport belt 15B where the medium is to be reliably transferred to the discharge roller pair 26, the medium is transported at an angle closer to the transport direction than in the region of the first transport belt 15A, and the medium can be appropriately transferred to the discharge roller pair 26.

Note that in a case where the first direction D1 and the second direction D2 are different, it is desirable to adjust the circulation speed of the first transport belt 15A and the circulation speed of the second transport belt 15B such that the transport speed in the +Y direction by the first transport belt 15A and the transport speed in the +Y direction by the second transport belt 15B are the same.

Modification 10

In a configuration in which the transport roller pair 25 that transports medium to the first transport belt 15A is provided upstream of the first transport belt 15A in the transport direction as in the present embodiment, the angle formed by the transport direction and the first direction D1 may be smaller than the angle formed by the transport direction and the second direction D2.

As described above, in a case where the transport roller pair 25 is provided upstream of the first transport belt 15A in the transport direction, it is difficult for the medium to rotate while the medium is nipped by the transport roller pair 25, and there is a concern that damage such as wrinkling will occur in the medium due to the restraining action of the transport roller pair 25 and the rotating action of the first transport belt 15A being simultaneously applied to the medium.

However, by making the angle formed by the transport direction and the first direction D1 smaller than the angle formed by the transport direction and the second direction D2, the rotating action applied to the medium by the first transport belt 15A is suppressed, and the occurrence of the above-described damage can be suppressed.

Note that in such a configuration, the angle between the transport direction and the first direction D1 and the angle between the transport direction and the second direction D2 may be adjusted in accordance with the lengths of the medium in the transport direction. For example, the longer the medium is in the transport direction, the longer the time during which the restraining action of the transport roller pair 25 and the rotating action of the first transport belt 15A will be simultaneously applied, and the higher the risk of damage, so the angle between the transport direction and the first direction D1 may be set smaller with increase in length of the medium in the transport direction.

Note that in a case where the first direction D1 and the second direction D2 are different, it is desirable to adjust the circulation speed of the first transport belt 15A and the circulation speed of the second transport belt 15B such that the transport speed in the +Y direction by the first transport belt 15A and the transport speed in the +Y direction by the second transport belt 15B are the same.

Modification 11

The second restriction section 32 may include an upstream second restriction section (not shown) provided for the first transport belt 15A and a downstream second restriction section (not shown) provided for the second transport belt 15B. The upstream second restriction section and the downstream second restriction section may be configured to be independently displaceable in the width direction. With such a configuration, it is possible to appropriately restrict the second edge Ps2 of the medium according to the first direction D1 and the second direction D2.

In this case, the downstream second restriction section may be closer to the first restriction section 31 than the upstream second restriction section. By this, the position in the width direction of the medium of which the skew is corrected can be appropriately regulated. In this case, it is also desirable to form an inclined guide surface for suppressing the medium from being caught upstream of the downstream second restriction section.

Modification 12

The second restriction section 32 may be provided so as to approach the first restriction section 31 downstream in the transport direction. By this, the position in the width direction of the medium of which the skew is corrected can be appropriately regulated.

In such a configuration, the second restriction section 32 may be configured by a plurality of restriction sections along the transport direction as in modification 11 described above.

Modification 13

In addition to the inclination of the transport belt with respect to the transport direction, the movement of the medium toward the first restriction section 31 may be performed by a paddle (not shown) that moves the medium toward the first restriction section 31 by rotating. Since the medium is moved to the first restriction section 31 by such a paddle, the skew of the medium can be appropriately corrected.

Coupling Section Coupling the Relay Unit and the Support Base

Next, the coupling section 150 for coupling the relay unit 4A and the support plate 6*b* of the first support base 6 will be described in detail with reference to FIG. 12 and subsequent drawings.

As shown in FIG. 12, the coupling section 150 is exposed on the lower side of the support plate 6*b*. As will be described in detail later, by accessing the coupling section 150 from the lower side of the support plate 6*b*, it is possible to adjust the position of the relay unit 4A with respect to the support plate 6*b* and by this it is possible to adjust the position of the relay unit 4A with respect to the recording device 3.

Note that hereinafter, adjustment of the position of the relay unit 4A is used to include the meaning of adjustment of the Y-axis direction position of the relay unit 4A, the X-axis direction position of the relay unit 4A, and the orientation in the X-Y plane (in particular, the orientation of the first restriction surface 31*a*) of the relay unit 4A. In the present embodiment, the relay unit 4A can adjust all of the Y-axis direction position, the X-axis direction position, and the orientation in the X-Y plane, but the present disclosure is not limited thereto.

To be specific, by the coupling section 150 in the present embodiment, the relay unit 4A can be fixed in place so as not to move in the Y-axis direction with respect to the support plate 6*b*, and the state of the relay unit 4A being fixed in place in the Y-axis direction can be released to allow the relay unit 4A to move along the Y-axis direction with respect to the support plate 6*b*. By the coupling section 150, the relay unit 4A can be fixed in place so as not to move in the X-axis direction with respect to the support plate 6*b*, and the state of being fixed in place in the X-axis direction can be released to allow the relay unit 4A to move along the X-axis direction with respect to the support plate 6*b*. By the coupling section 150, the relay unit 4A can be fixed in place so as not to pivot in the X-Y plane with respect to the support plate 6*b*, and the state of pivot being fixed in place can be released to allow the relay unit 4A to pivot in the X-Y plane with respect to the support plate 6*b*.

In the present embodiment, the above-described states of being fixed in place are performed by fastening screws, and the above-described states of being fixed in place are released by loosening the fastened screws.

Hereinafter, the configuration of the coupling section 150 will be described in more detail. As shown in FIGS. 13 to 16, the coupling section 150 includes a first plate 151, a second plate 152, a shaft 153, screws 155, screws 156, and screws 157.

The first plate 151 and the second plate 152 are plate members forming surfaces parallel to the X-Y plane, and are formed of, for example, a metal material.

The shaft 153 is a shaft forming an axial center along the Z-axis direction, is formed of, for example, a metal material, and is provided integrally with the first plate 151.

The second plate 152 is attached to the support plate 6*b* by the four screws 155 from the lower side of the support plate 6*b*. The first plate 151 is attached to the second plate 152 by the four screws 156 from the lower side of the second plate 152 and is coupled to the bottom plate 4*a* of the relay unit 4A by the two screws 157.

Figure 17:
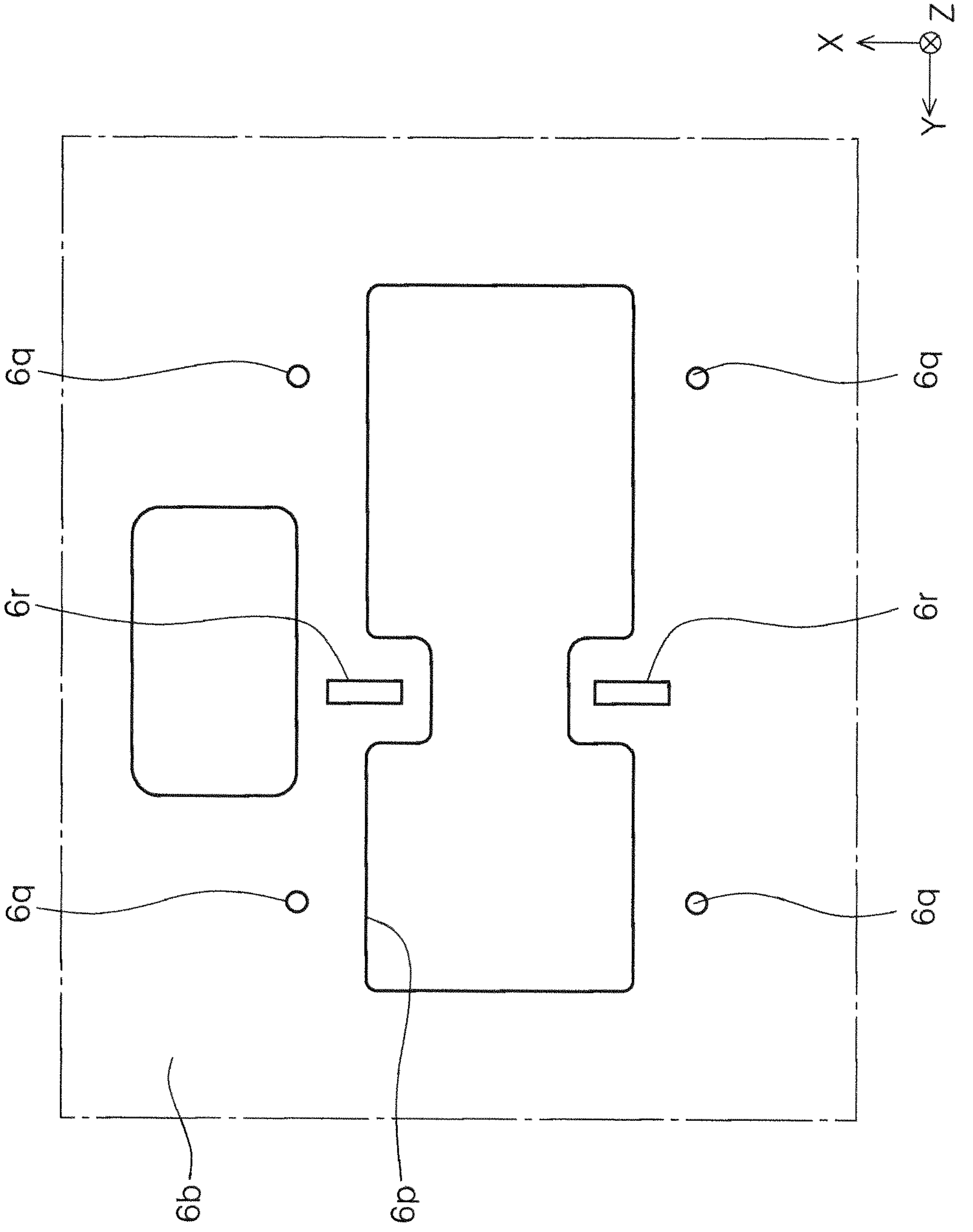
FIG. 17 is a plan view of a section of the support plate for supporting the relay transport device, to which the coupling section is attached.
Figure 18:
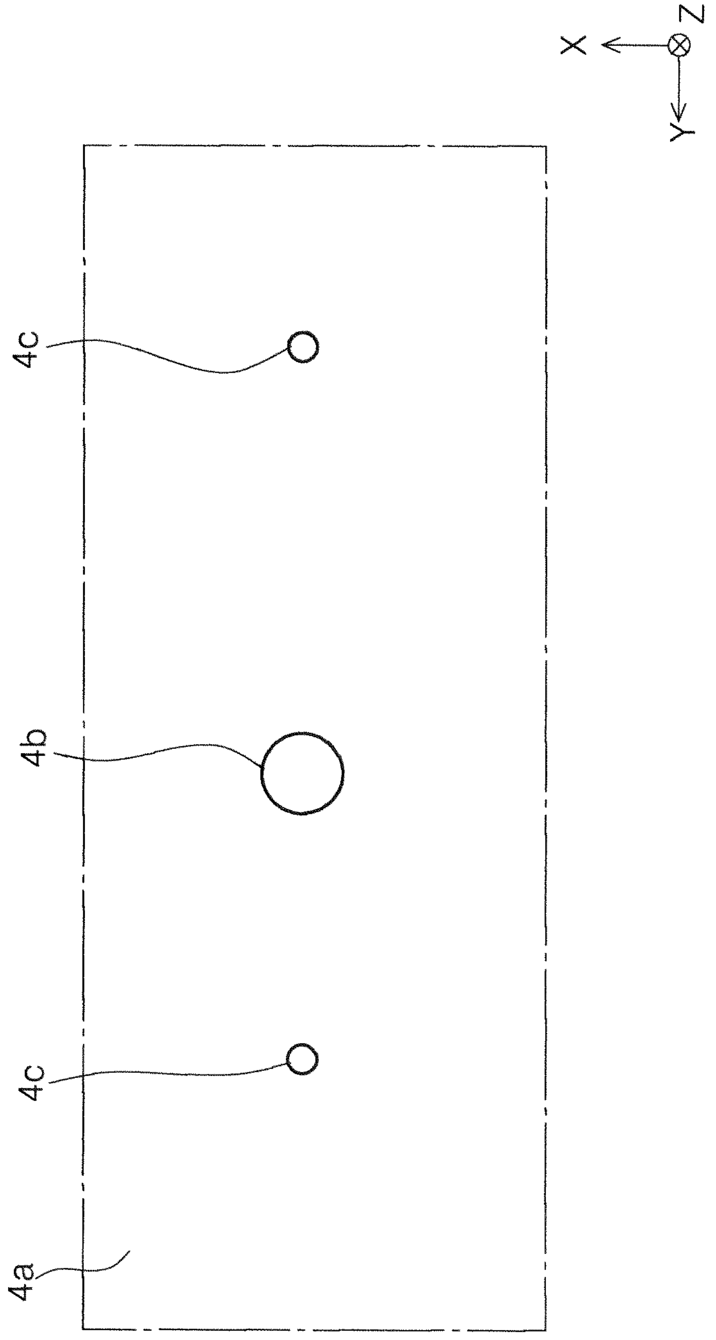
FIG. 18 is a plan view of a section of the bottom plate of the relay transport device to which the coupling section is attached.

More specifically, a window hole 152*f* extending along the Y-axis direction is formed in the second plate 152, and the shaft 153 passes through the window hole 152*f*, passes through a window hole 6*p* formed in the support plate 6*b* (see also FIG. 17), and enters a shaft hole 4*b* formed in the bottom plate 4*a* (see also FIG. 18). The shaft 153 serves as a pivot shaft when the relay unit 4A pivots with respect to the support plate 6*b*.

Rotation guide holes 151*b* and 151*c* are formed in the first plate 151. The rotation guide holes 151*b* and 151*c* are holes with arched shapes centered on the axial center of the shaft 153. The screws 157 pass through the rotation guide holes 151*b* and 151*c*. The two screws 157 further pass through window holes 152*d* and 152*e* formed in the second plate 152, and are fitted into screw holes 4*c* (see also FIG. 18) formed in the bottom plate 4*a* of the relay unit 4A. When the relay unit 4A pivots with respect to the support plate 6*b*, the screws 157 and 157 move relatively in the corresponding rotation guide holes 151*b* and 151*c*. When the relay unit 4A pivots with respect to the support plate 6*b*, the screws 157 and 157 move relatively in the corresponding window holes 152*d* and 152*e*.

Vertical guide holes 151*a* extending along the Y-axis direction are formed in the first plate 151. The screws 156 pass through the vertical guide holes 151*a*, and the screws 156 are fitted into screw holes 152*a* formed in the second plate 152.

When the relay unit 4A moves in the Y-axis direction with respect to the support plate 6*b*, the relay unit 4A and the first plate 151 move integrally. In this case, the screws 156 move relatively in the vertical guide hole 151*a*.

Note that a boss 151*d* protruding in the +Z direction is formed in the first plate 151, and the boss 151*d* enters a window hole 152*g* formed in the second plate 152. The window hole 152*g* is a hole extending along the Y-axis direction. When the relay unit 4A moves in the Y-axis direction with respect to the support plate 6*b*, the boss 151*d* moves relatively in the window hole 152*g*. By the boss 151*d* being guided in the Y-axis direction by the window hole 152*g*, the first plate 151 is guided in the Y-axis direction by the second plate 152.

When the relay unit 4A moves in the Y-axis direction with respect to the support plate 6*b*, the shaft 153 moves relatively in the window hole 152*f*.

A plurality of lateral guide holes 152*c* extending along the X-axis direction are formed in the second plate 152. The screws 155 pass through the lateral guide holes 152*c*, and the screws 155 are fitted into screw holes 6*q* (see FIG. 17) formed in the support plate 6*b*.

When the relay unit 4A moves in the X-axis direction with respect to the support plate 6*b*, the relay unit 4A, the first plate 151, and the second plate 152 move integrally. In this case, the screws 155 move relatively in the lateral guide holes 152*c*.

Note that in the second plate 152, bosses 152*b* protruding in the +Z direction are formed with an interval therebetween along the X-axis direction. The bosses 152*b* enter window holes 6*r* (see FIG. 17) formed in the support plate 6*b*. The window holes 6*r* are holes extending along the X-axis direction. When the relay unit 4A, the first plate 151, and the second plate 152 move in the X-axis direction with respect to the support plate 6*b*, the bosses 152*b* move relatively in the window holes 6*r*.

Since the bosses 152*b* are guided in the X-axis direction by the window holes 6*r*, the second plate 152 is guided in the X-axis direction by the support plate 6*b*.

Figure 16:
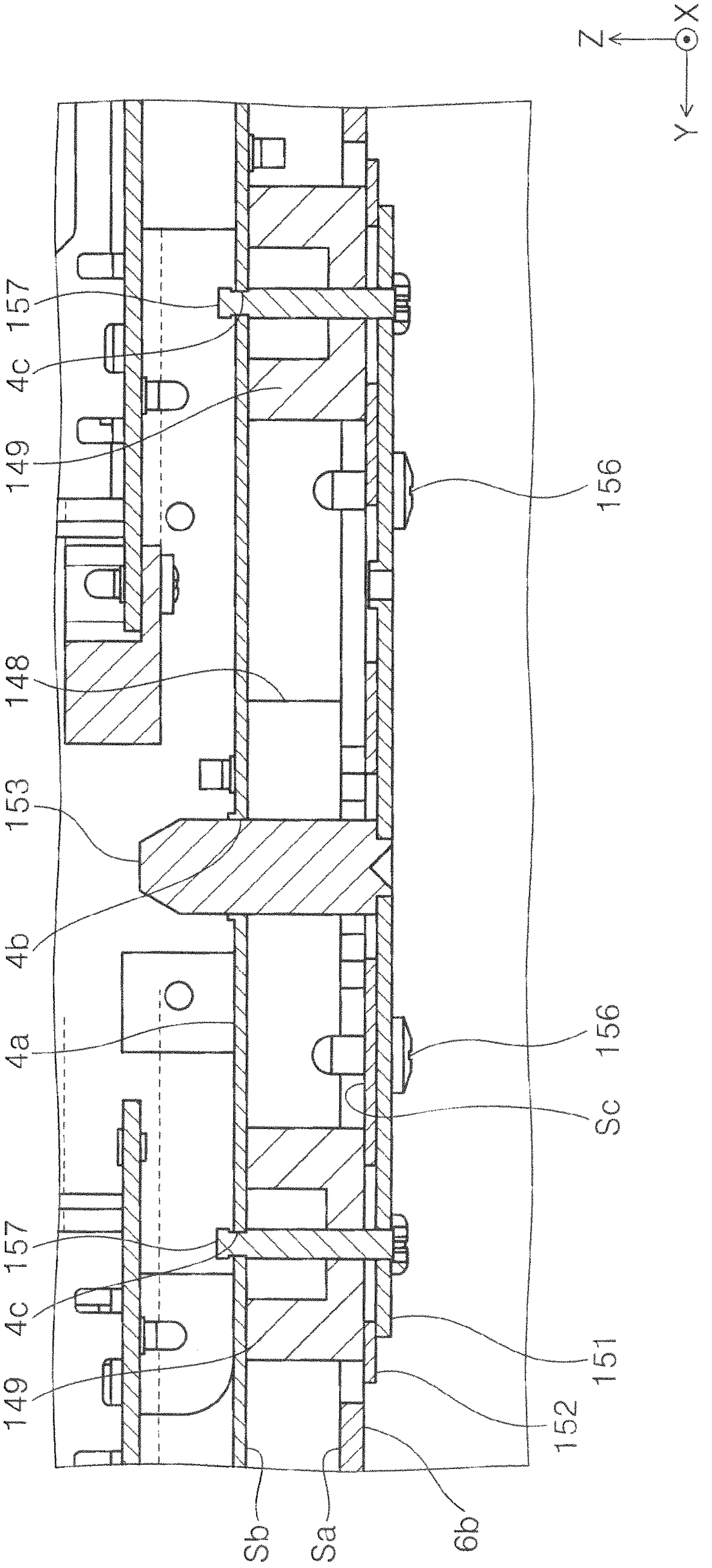
FIG. 16 is a cross-sectional view of the coupling section taken along the Y-Z plane.

Spacers 148 are provided between the bottom plate 4*a* of the relay unit 4A and the support plate 6*b*. As shown in FIG. 12, the spacers 148 are provided at appropriate intervals along the X-axis direction and the Y-axis direction. As shown in FIG. 16, spacers 149 are provided between the bottom plate 4*a* of the relay unit 4A and the second plate 152. As shown in FIGS. 13 to 16, the spacers 149 are provided in the coupling section 150 at positions of the screws 157. The screws 157 are inserted through the spacers 149 and fitted into the screw holes 4*c* of the bottom plate 4*a*.

Note that regarding the thicknesses (dimensions in the Z-axis direction) of the spacers 148 and the spacers 149, the spacers 149 are thicker than the spacers 148 by the thicknesses of the support plates 6*b*.

In FIG. 16, reference sign Sa denotes a support surface by which the support plate 6*b* supports the relay unit 4A, and reference sign Sb denotes a facing surface of the bottom plate 4*a* of the relay unit 4A that faces the support plate 6*b*. Reference sign Sc denotes a facing surface of the second plate 152 that faces the relay unit 4A. The spacers 148 are interposed between the support surface Sa and the opposing surface Sb and support the relay unit 4A. The spacers 149 are interposed between the facing surface Sc and the facing surface Sb.

In the present embodiment, the spacers 148 and 149 are formed of a material having good slidability, and are formed of POM (polyoxymethylene) as an example. By this, the friction coefficient between the facing surface Sb of the bottom plate 4*a* and the spacers 148 and the friction coefficient between the support surface Sa and the spacers 148 are smaller than the friction coefficient between the support surface Sa and the facing surface Sb.

The friction coefficient between the facing surface Sb of the bottom plate 4*a* and the spacers 149 and the friction coefficient between the facing surface Sc of the second plate 152 and the spacers 149 are smaller than the friction coefficient between the facing surface Sb of the bottom plate 4*a* and the facing surface Sc of the second plate 152.

Note that in this embodiment, the spacers 148 are attached to the bottom plate 4*a* of the relay unit 4A. By this, when the relay unit 4A moves in the X-axis direction or the Y-axis direction with respect to the support plate 6*b*, or when the relay unit 4A pivots around the shaft 153, friction is generated between the spacers 148 and the support surface Sa.

In a case where the relay unit 4A moves in the Y-axis direction with respect to the support plate 6*b*, friction is generated between the facing surface Sc of the second plate 152 and the spacers 149. When the relay unit 4A pivots around the shaft 153, friction occurs between the facing surface Sc of the second plate 152 and the spacers 149.

Note that in the present embodiment, the spacers 148 are attached to the bottom plate 4*a* of the relay unit 4A, but may be attached to the support plate 6*b*. The spacers 148 may be merely disposed between the bottom plate 4*a* and the support plate 6*b*, without being attached to either the bottom plate 4*a* or the support plate 6*b*.

Since the coupling section 150 is constituted as described above, the two fastened screws 157 are loosened when the relay unit 4A is to be pivoted about the shaft 153. By this, the relay unit 4A is allowed to pivot about the shaft 153, so that the relay unit 4A can be pivoted. In this case, the second plate 152 does not move, and the relay unit 4A and the first plate 151 integrally pivot.

The four fastened screws 156 are loosened when the relay unit 4A is to be moved in the Y-axis direction with respect to the support plate 6*b*. By this, the state of the first plate 151 being fixed to the second plate 152 is released, movement of the first plate 151 in the Y-axis direction is allowed, and the relay unit 4A can be moved in the Y-axis direction. In this case, the second plate 152 does not move, and the relay unit 4A and the first plate 151 integrally move in the Y-axis direction.

The fastened four screws 155 are loosened when the relay unit 4A is to be moved in the X-axis direction with respect to the support plate 6*b*. By this, the state of the second plate 152 being fixed to the support plate 6*b* is released, movement of the second plate 152 in the X-axis direction is allowed, and the relay unit 4A can be moved in the X-axis direction. In this case, the first plate 151, the second plate 152, and the relay unit 4A move integrally in the X-axis direction.

By adjusting the position of the relay unit 4A with respect to the first support base 6 as described above, it is possible to adjust the position of the relay unit 4A with respect to the recording device 3.

Hereinafter, a position adjustment method for adjusting the position of the relay unit 4A with respect to the recording device 3 will be further described with reference to FIGS. 19 and 20.

In FIG. 19, reference sign Pjs denotes a correction sheet, reference sign Pjs1 denotes a lateral edge of the correction sheet Pjs along the transport direction, and reference sign Pjs2 denotes a downstream edge of the correction sheet Pjs on the downstream side in the transport direction among edges of the correction sheet Pjs along the widthwise direction.

Figure 20:
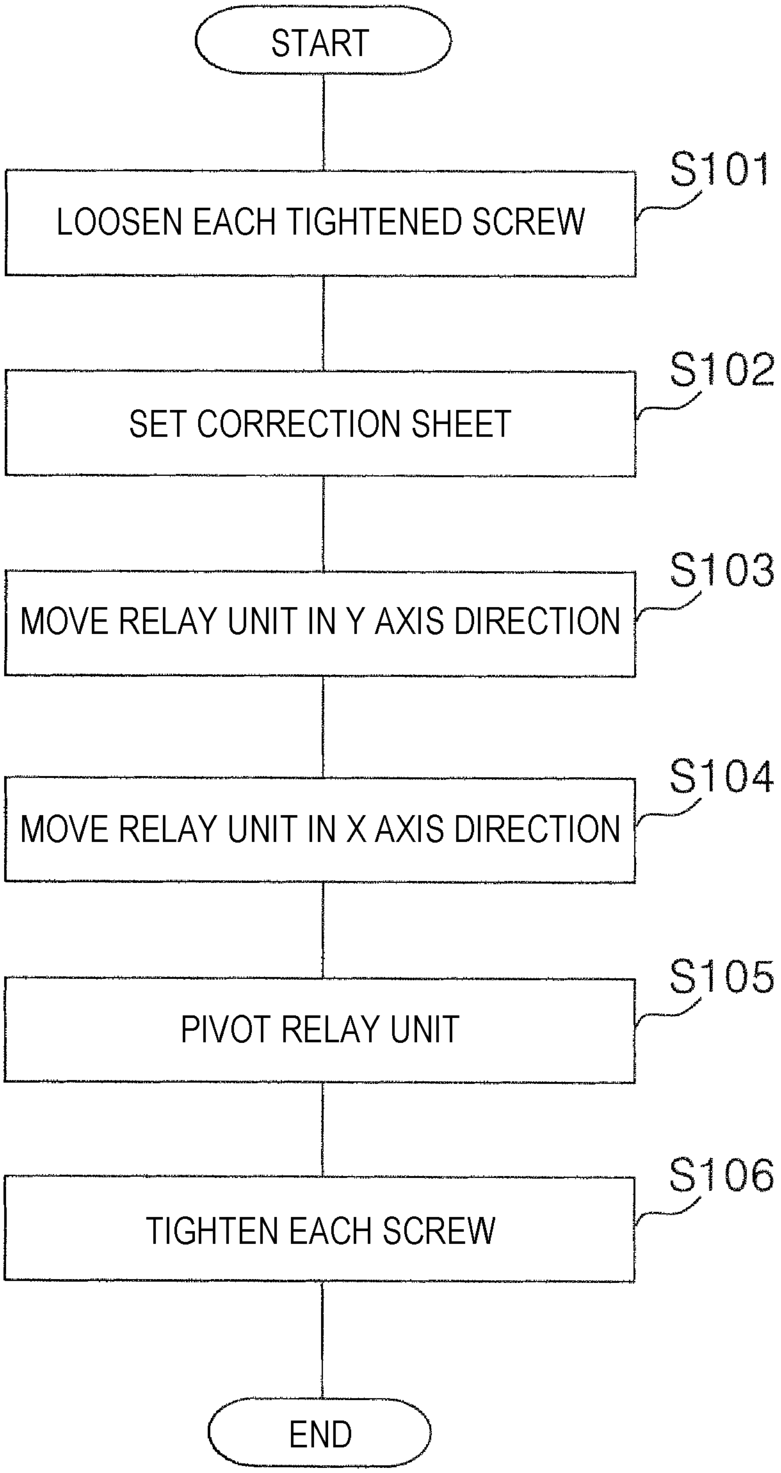
FIG. 20 is a flowchart illustrating a procedure of a position adjustment method for adjusting a position of a relay unit.

The flow of the position adjustment method is shown in FIG. 20, and first, the screws (155, 156, 157) fastened in the coupling section 150 are loosened (step S101). Next, the correction sheet Pjs is set so that the downstream edge Pjs2 of the correction sheet Pjs abuts against the nip position of the registration roller pair 109 (step S102). FIG. 19 shows a state in which the downstream edge Pjs2 of the correction sheet Pjs abuts the nip position of the registration roller pair 109.

Next, the relay unit 4A is moved in the Y-axis direction to adjust the position of the relay unit 4A in the Y-axis direction (step S103). By this, the interval between the relay unit 4A and the recording device 3 in the Y direction can be appropriately set, and the medium can be reliably transferred from the relay unit 4A to the recording device 3.

Next, the relay unit 4A is moved in the X-axis direction to adjust the position of the relay unit 4A in the X-axis direction (step S104). By this, it is possible to appropriately set the relative position between the relay unit 4A and the recording device 3 in the X-axis direction, and to appropriately set the X-axis direction position of the medium at the time that the medium is transferred to the recording device 3.

Note that the position of the relay unit 4A in the X-axis direction may be adjusted by performing test printing, and based on the result of the test printing, for example, the position of the recording area with respect to the medium, that is, the position of the line head 105 with respect to the medium may be adjusted to be appropriate.

Next, the relay unit 4A is pivoted to adjust the orientation of the relay unit 4A with respect to the recording device 3 (step S105). The adjustment of the orientation of the relay unit 4A is performed by pivoting the relay unit 4A so that the lateral edge Pjs1 of the correction sheet Pjs comes into contact with the first restriction section 31 along the first restriction section 31. By this, it is possible to transfer the medium that had skew suppressed in the relay unit 4A, to the recording device 3 at an appropriate angle with its skew corrected state maintained. As a result, it is possible to appropriately suppress the medium from being supplied from the relay transport device 4 to the recording device 3 in a skewed state that exceeds the skew correction capability of the registration roller pair 109, and it is possible to obtain more appropriate recording quality.

After the position of the relay unit 4A with respect to the first support base 6 is adjusted as described above, the screws (155, 156, and 157) are tightened (step S106).

Note that the order of the above-described steps may be changed as appropriate, and it is not always necessary to execute all the steps. For example, only necessary ones of the Y-axis direction movement, the X-axis direction movement, and pivoting of the relay unit 4A may be performed. The screws (155, 156, and 157) may not be tightened all at once after all the steps are performed, but each screw may be fastened after execution of each step, that is, each screw may be tightened at the adjusted position after each step is performed.

The operational effects of the coupling section 150 will be described below.

The coupling section 150 couples the relay unit 4A and the first support base 6 so in a manner that enables the position of the relay unit 4A with respect to the first support base 6 to be adjusted. Then, by adjusting the position of the relay unit 4A with respect to the first support base 6, the position of the relay unit 4A with respect to the recording device 3 is adjusted. In particular, the position of the discharge roller pair 26 with respect to the feed roller 107 is adjusted.

By this, it is possible to flexibly adjust the transfer position of the medium from the relay transport device 4 to the recording device 3, and it is possible to perform appropriate recording in the recording device 3.

The coupling section 150 allows movement of the relay unit 4A along the transport direction (Y-axis direction) of the medium in the relay unit 4A. By this, the interval between the relay unit 4A and the recording device 3 in the transport direction can be adjusted, and the relay unit 4A can reliably transfer the medium to the recording device 3.

The coupling section 150 allows the relay unit 4A to move along the widthwise direction (X-axis direction), which intersects the transport direction of the medium in the relay unit 4A. By this, it is possible to adjust the width direction position at the time when the relay unit 4A transfers the medium to the recording device 3, and thus it is possible to obtain appropriate recording quality in the recording device 3.

The coupling section 150 allows the relay unit 4A to pivot along the support surface Sa on which the first support base 6 supports the relay unit 4A (pivoting in the X-Y plane in the embodiment). By this, it is possible to suppress skew at the time of when the medium is transferred from the relay unit 4A to the recording device 3, and thus it is possible to obtain appropriate recording quality in the recording device 3.

The relay unit 4A includes a skew correction section 9 that corrects skew of the medium. By this, even if the medium fed from the feeding device 5 is skewed, the skew can be corrected in the relay unit 4A. In addition, in combination with the pivoting of the relay unit 4A with respect to the first support base 6, it is possible to transfer the medium to the recording device 3 in an appropriate orientation.

The coupling section 150 includes a first plate 151 that can be fixed and pivoted with respect to the first support base 6 and that is coupled to the relay unit 4A. Thus, the relay unit 4A can be pivoted with a simple structure.

Note that in the present embodiment, the first plate 151 can be fixed and pivoted with respect to the first support base 6 via the second plate 152, but may be directly fixed and pivoted with respect to the first support base 6.

The coupling section 150 includes the second plate 152 which can be fixed to the first support base 6 and can move along the width direction, and the first plate 151 can be fixed to and can pivot with respect to the first support base 6 via the second plate 152 and can be fixed to and can move along the transport direction with respect to the second plate 152.

According to such a configuration, the relay unit 4A is movable along the width direction in addition to being pivotable along the support surface Sa, and it is possible to adjust the width direction position for at the time when the relay unit 4A transfers the medium to the recording device 3, and thus it is possible to obtain appropriate recording quality.

Since the first plate 151 can be fixed to the second plate 152 and can move along the transport direction, the relay unit 4A can further move along the transport direction. By this the interval between the relay unit 4A and the recording device 3 in the transport direction can be adjusted, and the relay unit 4A can reliably transfer the medium to the recording device 3.

Note that the coupling section 150 is not limited to the above-described configuration, and may have any configuration as long as the position of the relay unit 4A with respect to the first support base 6 can be adjusted.

For example, the second plate 152 may be omitted, and the first plate 151 may be directly attached to the support plate 6*b*. In this case, the screw holes 152*a* and the window holes 152*d*, 152*e*, 152*f*, and 152*g* provided in the second plate 152 are directly formed in the support plate 6*b*. By this, the first plate 151 and the relay unit 4A can move along the Y-axis direction with respect to the support plate 6*b*. However, in this case, the coupling section 150 does not allow the relay unit 4A to move in the X-axis direction.

In such a configuration, the vertical guide hole 151*a* of the first plate 151 may be formed so as to extend along the X-axis direction, and the window holes 152*d*, 152*e*, 152*f*, 152*g* formed in the support plate 6*b* may also be formed so as to extend along the X-axis direction. In this case, the first plate 151 and the relay unit 4A can move along the X-axis direction with respect to the support plate 6*b*. However, in this case, the coupling section 150 does not allow the relay unit 4A to move in the Y-axis direction.

Both the first plate 151 and the second plate 152 may be omitted, and the relay unit 4A may be configured to be directly movable and fixable with respect to the support plate 6*b*. However, as in the embodiment described above, by using the first plate 151 and the second plate 152, the relay unit 4A can be moved and fixed in the X-axis direction and the Y-axis direction with respect to the first support base 6 with a simple structure, and can be pivoted and fixed.

Since the spacers 148 are provided between the facing surface Sb of the bottom plate 4*a* and the support surface Sa, it is possible to reduce the contact surface compared to a case where the bottom plate 4*a* of the relay unit 4A and the support surface Sa directly contact each other, and it is possible to reduce the frictional resistance when the relay unit 4A moves with respect to the first support base 6.

Since the friction coefficient between the spacers 148 and the support surface Sa and the friction coefficient between the spacers 148 and the facing surface Sb are lower than the friction coefficient between the support surface Sa and the facing surface Sb, it is possible to further reduce the frictional resistance in a case where the relay unit 4A moves with respect to the first support base 6.

Figure 21:
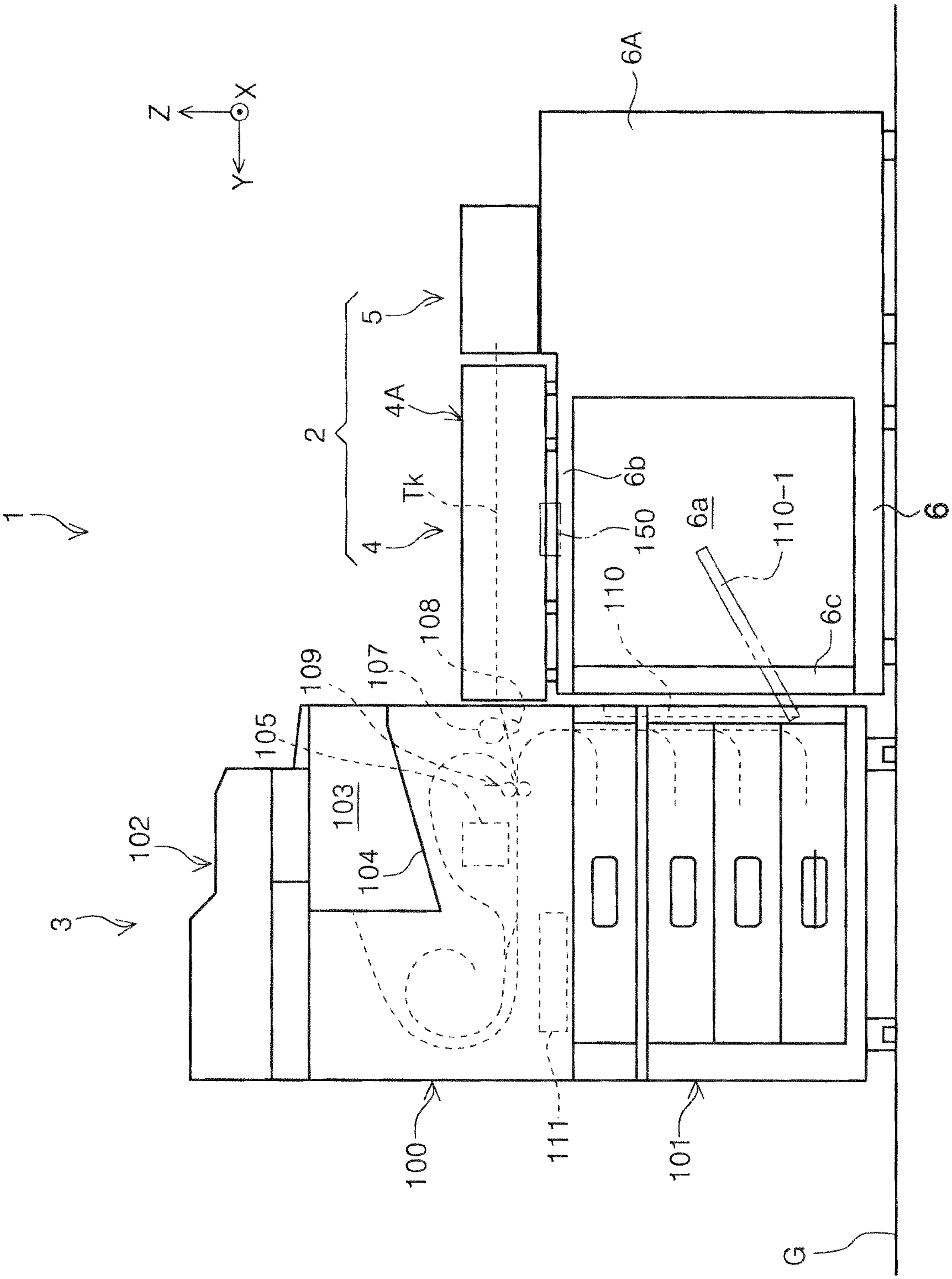
FIG. 21 is a diagram illustrating configuration in which a relay transport device and a feeding device are supported by one support base.

Note that in this embodiment, the first support base 6 for supporting the relay transport device 4 and the second support base 7 for supporting the feeding device 5 are formed separately, but the relay transport device 4 and the feeding device 5 may be supported by a single support base 6A like the support base 6A shown in FIG. 21.

The relay transport device 4 includes the skew correction section 9, and the skew correction section 9 includes the first restriction section 31, which positions one width direction edge of the medium fed from the feeding device 5, and the transport section 10, which transports the medium toward the first restriction section 31 in an intersecting direction, which intersects the transport direction and the width direction. In such a configuration, the relationship between the direction in which the medium is transferred from the feeding device 5 to the relay transport device 4 and the direction in which the transport section 10 transports the medium is important. In the present aspect, since the relay unit 4A is pivotable along the support surface Sa, it is possible to adjust the direction in which the feeding device 5 transfers the medium to the relay transport device 4 and the direction in which the transport section 10 transports the medium, and it is possible to appropriately transfer the medium from the feeding device 5 to the relay transport device 4.

Figure 22:
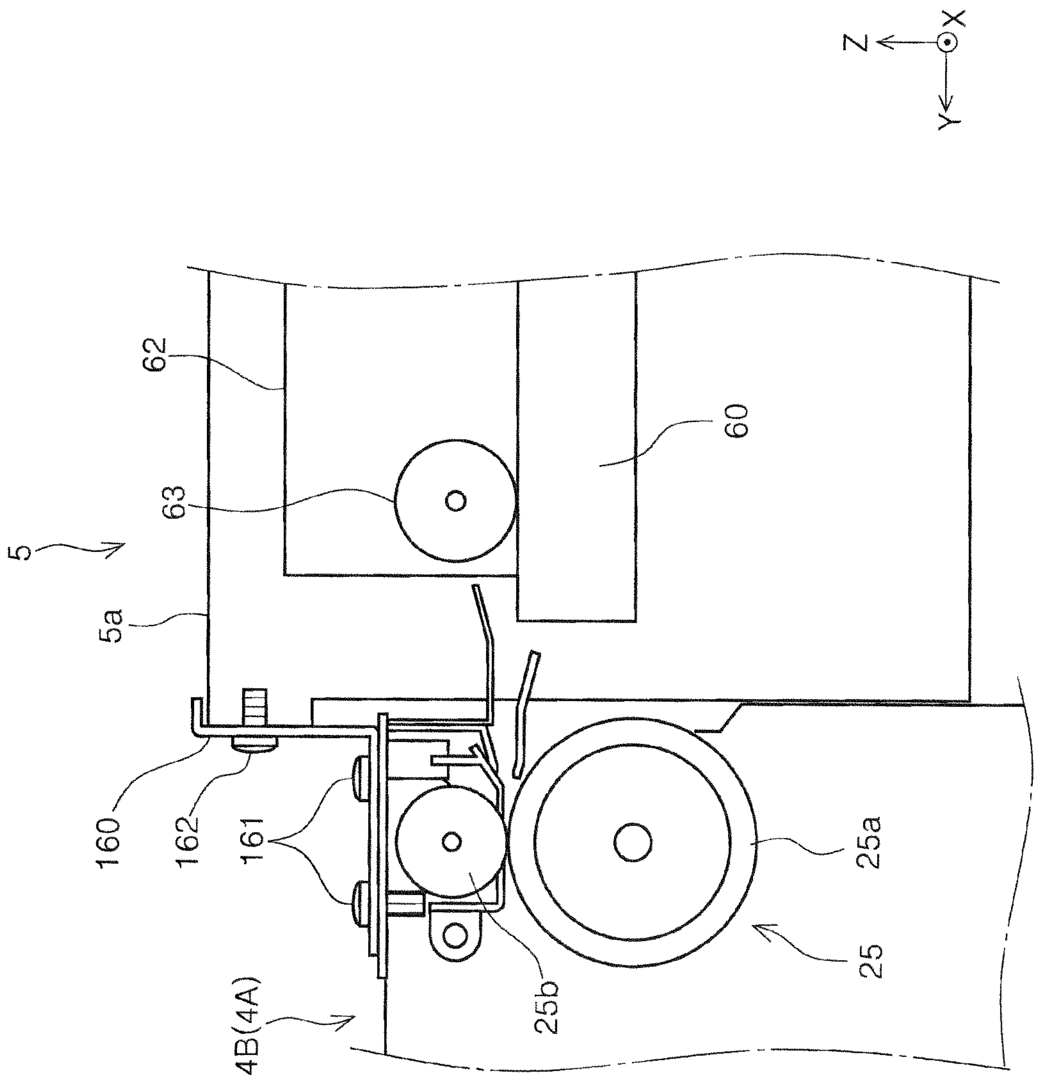
FIG. 22 is a diagram illustrating a coupling section that couples a relay unit and a feeding device.

Note that the relay unit 4A and the feeding device 5 may be connected by a coupling section. FIG. 22 illustrates an example in which the relay unit 4A and the feeding device 5 are connected by a coupling section, and reference numeral 160 denotes the coupling section. The coupling section 160 is an L-shaped member when viewed from the X-axis direction, and is formed of, for example, a metal plate material. Although not shown, a plurality of, for example, two coupling sections 160 are provided separated by an interval along the X-axis direction. The coupling section 160 is fixed to the device main body 5*a* of the feeding device 5 by a screw 162 and is fixed to the unit body 4B of the relay unit 4A by a screw 161. According to such a coupling section 160, it is possible to suppress a change in the positional relationship between the feeding device 5 and the relay unit 4A.

In particular, in a case where the support base (first support base 6) that supports the relay transport device 4 and the support base (second support base 7) that supports the feeding device 5 are separate, the positional relationship between the feeding device 5 and the relay unit 4A is likely to change. However, according to the coupling section 160 as described above, it is possible to suppress a change in the positional relationship between the feeding device 5 and the relay unit 4A.

Note that in the coupling section 160, a hole (not shown) through which the screw 161 is inserted or a hole (not shown) through which the screw 162 is inserted may be formed as a hole elongated along the X-axis direction so that the relative positions of the relay unit 4A and the feeding device 5 in the X-axis direction can be adjusted when the relay unit 4A and the feeding device 5 are connected to each other. In the coupling section 160, a hole (not shown) through which the screw 161 is inserted or a hole (not shown) through which the screw 162 is inserted may be formed to be larger than the screw outer diameter in both the X-axis direction and the Y-axis direction so that the relative position in the X-axis direction and the relative position in the Y-axis direction of the relay unit 4A and the feeding device 5 can be adjusted when connecting the relay unit 4A and the feeding device 5. With such a configuration, it is possible to adjust an angle for when the medium is transferred from the feeding device 5 to the relay unit 4A.

Since the first support base 6 can adjust the position of the relay unit 4A in the vertical direction, it is possible to adjust the position in the vertical direction for the time when the medium is transferred from the relay unit 4A to the recording device 3, and it is possible to more appropriately transfer the medium from the relay unit 4A to the recording device 3.

Note that the position of the relay unit 4A in the vertical direction can also be adjusted in the support base 6A shown in FIG. 21 by the same configuration as that of the first support base 6.

In the present embodiment, the recording device 3 includes a registration roller pair 109 configured to correct skew of the medium. Therefore, by pivoting the relay unit 4A so that the axial direction of the registration roller pair 109 and the medium transport direction by the relay unit 4A (particularly, the direction of the first restriction surface 31*a*) are orthogonal to each other, it is possible to suppress the medium from being transferred from the relay transport device 4 to the recording device 3 in a skew state that exceeds the skew correction capability of the registration roller pair 109.

Note that in the configuration in which the skew correction of the medium is performed in the direction along the first restriction section 31, since the position of the first restriction section 31 becomes the position of the medium edge, it is desirable to adjust the position of the relay unit 4A so that the position of the first restriction section 31 in the X-axis direction becomes accurate with respect to the recording position of the line head 105.

Since it is desirable that the medium subjected to the skew correction along the first restriction section 31 enters the registration roller pair 109 at a right angle, it is desirable to adjust the angle of the relay unit 4A such that the registration roller pair 109 and the first restriction section 31 are orthogonal to each other.

The recording device 3 includes the mounting section 114 on which the placement tray 113, on which a medium can be placed, can be mounted. The feed roller 107 can feed the medium placed on the placement tray 113, and the medium can be transferred from the relay unit 4A to the feed roller 107 in a state where the placement tray 113 is detached from the mounting section 114. By this it is possible to feed a medium of a type or an amount which cannot be mounted on the placement tray 113 to the inside of the recording device 3, and usability is improved. The feeding roller 107 can feed the medium placed on the placement tray 113, that is, the feeding roller 107 has both a function of feeding the medium from the placement tray 113 and a function of receiving the medium from the relay unit 4A. Therefore, it is possible to suppress an increase in cost of the device.

The position adjustment method for adjusting the position of the relay transport device 4 with respect to the recording device 3 includes a step (step S102 in FIG. 20) of bringing the downstream edge Pjs2 of the correction sheet Pjs, which has the lateral edge Pjs1 along the transport direction and the downstream edge Pjs2 downstream in the transport direction, into contact with the nip position of the registration roller pair 109, and a step (step S105 in FIG. 20) of pivoting the relay unit 4A with respect to the first support base 6 so that the lateral edge Pjs1 of the correction sheet Pjs contacts along the first restriction section 31.

By this, it is possible to transfer the medium that had the skew suppressed in the relay unit 4A to the recording device 3 at an appropriate angle with its skew corrected state maintained. As a result, it is possible to appropriately suppress the medium from being transferred from the relay transport device 4 to the recording device 3 in a skew state that exceeds the skew correction capability of the registration roller pair 109, and it is possible to obtain more appropriate recording quality.

The position adjustment method for adjusting the position of the relay transport device 4 with respect to the recording device 3 includes a step (step S102 in FIG. 20) of bringing the downstream edge Pjs2 of the correction sheet Pjs into contact with the nip position of the registration roller pair 109, a step (step S103 in FIG. 20) of moving the relay unit 4A along the transport direction with respect to the first support base 6, a step (step S104 in FIG. 20) of moving the relay unit 4A along the widthwise direction with respect to the first support base 6, and a step (step S105 in FIG. 20) of pivoting the relay unit 4A with respect to the first support base 6 so that the lateral edge Pjs1 of the correction sheet Pjs comes into contact along the first restriction section 31.

According to such a position adjustment method, by moving the relay unit 4A along the transport direction with respect to the first support base 6, it is possible to appropriately set the interval in the transport direction between the relay unit 4A and the recording device 3, and to reliably transfer the medium from the relay unit 4A to the recording device 3.

By moving the relay unit 4A along the widthwise direction with respect to the first support base 6, it is possible to appropriately set the relative positions of the relay unit 4A and the recording device 3 in the widthwise direction and it is possible to appropriately set the widthwise direction position of the medium at the time when the medium is being passed to the recording device 3.

In a state where the downstream edge Pjs2 of the correction sheet Pjs abuts the nip position of the registration roller pair 109, the relay unit 4A is pivoted with respect to the first support base 6 so that the lateral edge Pjs1 of the correction sheet Pjs contacts along the first restriction section 31 and by this, it is possible to transfer the medium that had the skew suppressed in the relay unit to the recording device 3 at an appropriate angle with its skew corrected state maintained. By this it is possible to appropriately suppress the medium from being transferred from the relay transport device 4 to the recording device 3 in a skew state that exceeds the skew correction capability of the registration roller pair 109, and it is possible to obtain more appropriate recording quality.

The present disclosure is not limited to the embodiments described above, and various modifications can be made within the scope of the disclosure described in the claims, and it is needless to say that these are also included in the scope of the present disclosure.

What is claimed is:

1. A relay transport device that is positioned between a recording device, which is for recording on a medium, and a feeding device, which is disposed outside the recording device and is configured to feed the medium to the recording device, and that is configured to relay and transport the medium fed from the feeding device to the recording device, the relay transport device comprising:

a relay unit that is a unit that forms a transport path for transporting the medium and that includes a medium discharge section configured to discharge the medium toward a receiving section of the recording device and a coupling section that couples the relay unit and a support base supporting the relay unit, wherein the coupling section couples the relay unit and the support base such that a position of the relay unit with respect to the support base is adjustable and a position of the medium discharge section with respect to the receiving section is adjusted by adjusting a position of the relay unit with respect to the support base.

2. The relay transport device according to claim 1, wherein the coupling section allows movement of the relay unit along a transport direction of the medium in the relay unit.

3. The relay transport device according to claim 1, wherein the coupling section allows movement of the relay unit along a width direction intersecting a transport direction of the medium in the relay unit.

4. The relay transport device according to claim 1, wherein the coupling section allows pivoting of the relay unit along a support surface by which the support base supports the relay unit.

5. The relay transport device according to claim 4, wherein the relay unit includes a skew correction section that corrects skew of the medium.

6. The relay transport device according to claim 5, wherein the coupling section includes a first plate that is fixable and pivotable with respect to the support base and that is coupled to the relay unit.

7. The relay transport device according to claim 6, wherein the coupling section includes a second plate fixable to the support base and movable along a width direction, which is a direction intersecting a transport direction of the medium in the relay unit, and the first plate is fixable and pivotable with respect to the support base via the second plate and is fixable and movable along the transport direction with respect to the second plate.

8. The relay transport device according to claim 7, further comprising:

a spacer between a bottom plate of the relay unit and the support surface, wherein a friction coefficient between the spacer and the support surface and a friction coefficient between the spacer and the bottom plate are lower than a friction coefficient between the support surface and the bottom plate.

9. A feeding system comprising:

the relay transport device according to claim 1 and a feeding device that is supported by the support base and that feeds the medium to the relay transport device.

10. A feeding system comprising:

the relay transport device according to claim 1 and a feeding device configured to feed the medium to the relay transport device and that, assuming that the support base serves as a first support base, is supported by a second support base different from the first support base.

11. A feeding system comprising:

the relay transport device according to claim 5 and a feeding device configured to feed the medium to the relay transport device, wherein the skew correction section includes a restriction section configured to position one edge in a width direction of the medium fed from the feeding device, the width direction being a direction intersecting a transport direction of the medium in the relay unit and a transport section that transports the medium toward the restriction section in an intersecting direction that intersects the transport direction and the width direction.

12. The feeding system according to claim 10, further comprising:

a coupling section coupling the feeding device and the relay unit.

13. The feeding system according to claim 9, wherein the support base is configured to adjust a position of the relay unit in a vertical direction.

14. The feeding system according to claim 10, wherein the first support base is configured to adjust a position of the relay unit in a vertical direction.

15. A recording system comprising:

the relay transport device according to claim 1 and the recording device configured to record on the medium transported by the relay transport device.

16. A recording system comprising:

the relay transport device according to claim 4 and the recording device configured to record on the medium transported by the relay transport device, wherein the recording device includes a skew correction roller pair configured to correct skew of the medium.

17. A recording system comprising:

the relay transport device according to claim 5 and the recording device configured to record on the medium transported by the relay transport device, wherein the skew correction section includes a restriction section configured to position one edge in a width direction of the medium fed from the feeding device, the width direction being a direction intersecting a transport direction of the medium in the relay unit and a transport section that transports the medium toward the restriction section in an intersecting direction that intersects the transport direction and the width direction, and the recording device includes a skew correction roller pair configured to correct skew of the medium.

18. The recording system according to claim 15, wherein the recording device includes a mount section to which is attachable a placement tray configured to have placed thereon a medium, the receiving section of the recording device is configured to feed the medium placed on the placement tray, and the medium is transferable from the relay unit to the receiving section in a state where the placement tray is detached from the mounting section.

19. A recording system comprising:

the feeding system according to claim 9 and the recording device that performs recording on the medium fed by the feeding system.

20. A position adjustment method for adjusting a position of a relay transport device with respect to a recording device of a recording system, the recording system including the recording device for recording on a medium, a feeding device disposed outside the recording device and configured to feed the medium to the recording device, and the relay transport device, which is positioned between the recording device and the feeding device and is configured to relay and transport the medium fed from the feeding device to the recording device, wherein the relay transport device includes a relay unit that is a unit that forms a transport path for transporting the medium and that includes a medium discharge section configured to discharge the medium toward a receiving section of the recording device and a coupling section that couples the relay unit and a support base supporting the relay unit, the coupling section couples the relay unit and the support base such that a position of the relay unit with respect to the support base is adjustable, a position of the medium discharge section with respect to the receiving section is adjusted by adjusting a position of the relay unit with respect to the support base, the coupling section allows pivoting of the relay unit along a support surface by which the support base supports the relay unit, the relay unit includes a skew correction section that corrects skew of the medium, the skew correction section includes a restriction section configured to position one edge in a width direction of the medium fed from the feeding device, the width direction being a direction intersecting a transport direction of the medium in the relay unit and a transport section that transports the medium toward the restriction section in an intersecting direction that intersects the transport direction and the width direction, and the recording device includes a skew correction roller pair that corrects skew of the medium, the position adjustment method comprising:

a step of bringing a downstream edge of a correction sheet into contact with a nip position of the skew correction roller pair, the correction sheet having a lateral edge and the downstream edge, the lateral edge being along the transport direction, and the downstream edge being downstream in the transport direction and orthogonal to the lateral edge and a step of pivoting the relay unit with respect to the support base such that the lateral edge of the correction sheet contacts along the restriction section.

* * * * *